(12) United States Patent
Lee et al.

(10) Patent No.: US 9,857,957 B2
(45) Date of Patent: Jan. 2, 2018

(54) PORTABLE DEVICE AND METHOD OF CONTROLLING THE SAME

(71) Applicant: LG ELECTRONICS INC., Seoul (KR)

(72) Inventors: Doyoung Lee, Seoul (KR); Sinae Chun, Seoul (KR); Juhwan Lee, Seoul (KR); Sihwa Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 516 days.

(21) Appl. No.: 14/606,772

(22) Filed: Jan. 27, 2015

(65) Prior Publication Data

US 2016/0184700 A1 Jun. 30, 2016

(30) Foreign Application Priority Data

Dec. 29, 2014 (KR) ........................ 10-2014-0192498

(51) Int. Cl.
A63F 13/2145 (2014.01)
G06F 3/0484 (2013.01)
G06F 1/16 (2006.01)
G06F 3/14 (2006.01)
G06F 3/0488 (2013.01)

(52) U.S. Cl.
CPC ........ G06F 3/04847 (2013.01); G06F 1/1613 (2013.01); G06F 1/1641 (2013.01); G06F 1/1643 (2013.01); G06F 3/04883 (2013.01); G06F 3/1423 (2013.01); G09G 2300/02 (2013.01)

(58) Field of Classification Search
CPC .................... A63F 13/2145; A63F 2009/2457
See application file for complete search history.

(56) References Cited

U.S. PATENT DOCUMENTS

| 8,654,095 B1* | 2/2014 | Cho ....................... G06F 3/0412 345/173 |
| 2006/0146488 A1 | 7/2006 | Kimmel |
| 2011/0090155 A1 | 4/2011 | Caskey et al. |
| 2012/0194448 A1* | 8/2012 | Rothkopf ............. A45C 13/002 345/173 |
| 2013/0010405 A1 | 1/2013 | Rothkopf et al. |
| 2013/0106809 A1 | 5/2013 | Ohsaki |
| 2014/0240289 A1* | 8/2014 | Myers ................. H04M 1/0268 345/174 |
| 2016/0184700 A1* | 6/2016 | Lee ....................... G06F 1/1613 463/31 |

FOREIGN PATENT DOCUMENTS

| WO | WO 2010/028406 A1 | 3/2010 |
| WO | WO 2013/103278 A1 | 7/2013 |

* cited by examiner

Primary Examiner — Omkar Deodhar
(74) Attorney, Agent, or Firm — Birch, Stewart, Kolasch & Birch, LLP

(57) ABSTRACT

A portable device and a method for controlling the same are disclosed herein. The method includes the steps of detecting a folded state, wherein the first body is folded to the second body, displaying a first interface on a side display area, wherein the first interface is configured of a first part and a second part and includes multiple objects, detecting a first control input configured to select a first object included in the first interface, and displaying a first application respective to the first object, when a first triggering signal configured to shift the portable device from the folded state to an unfolded state is detected.

20 Claims, 22 Drawing Sheets

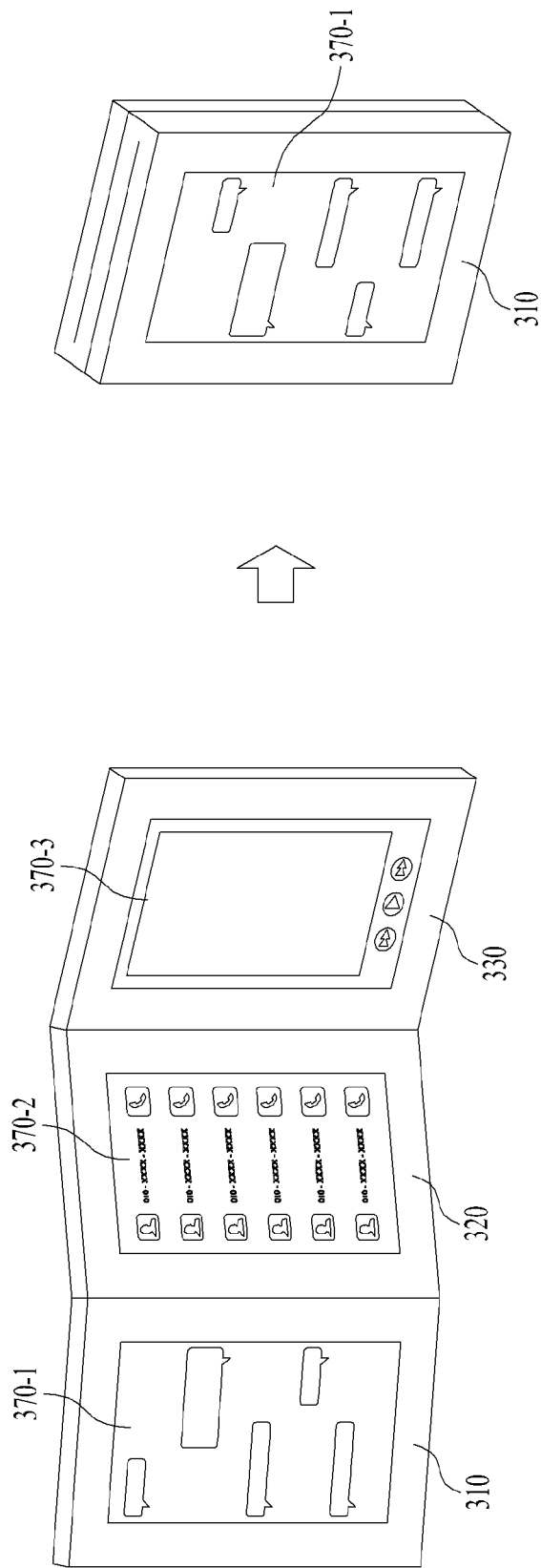

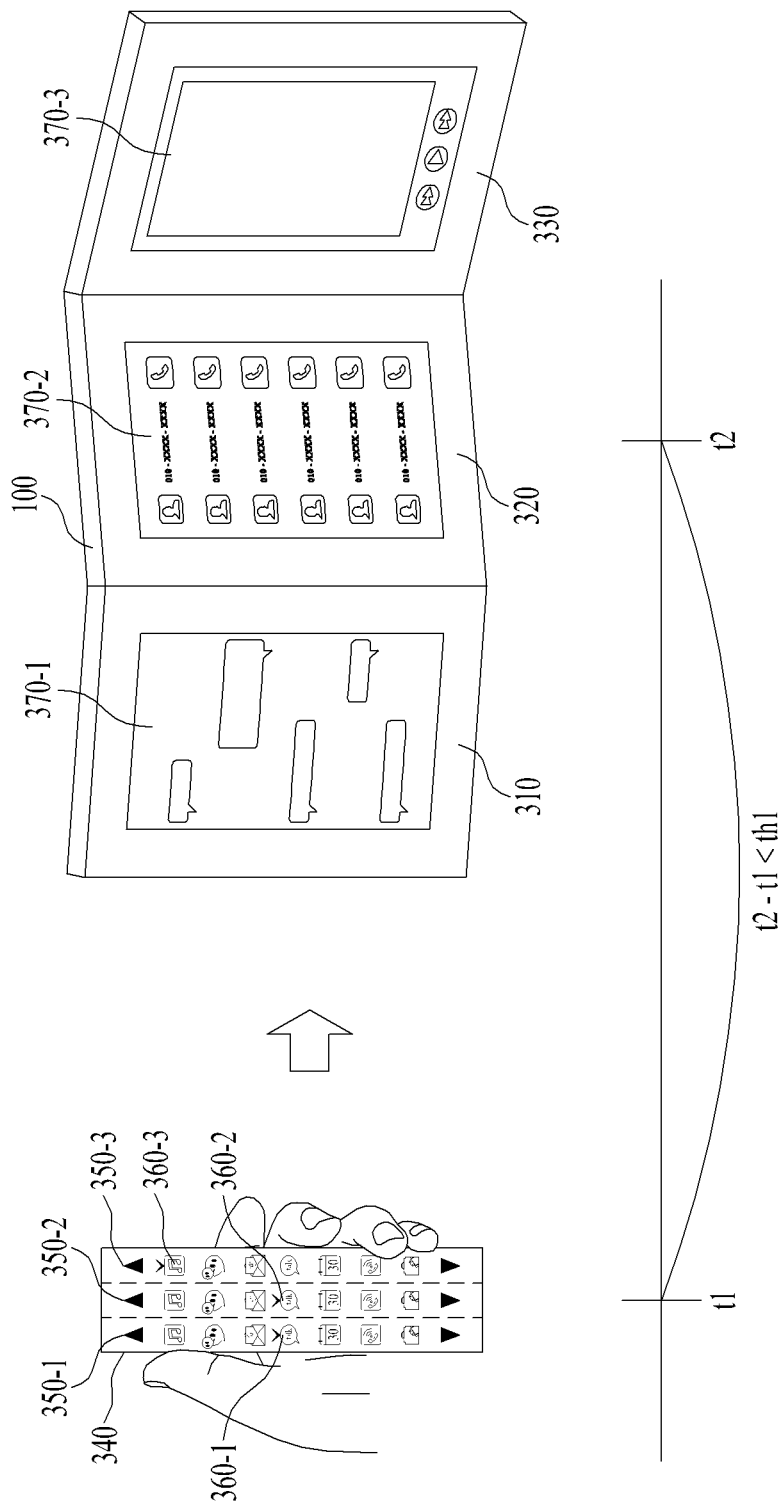

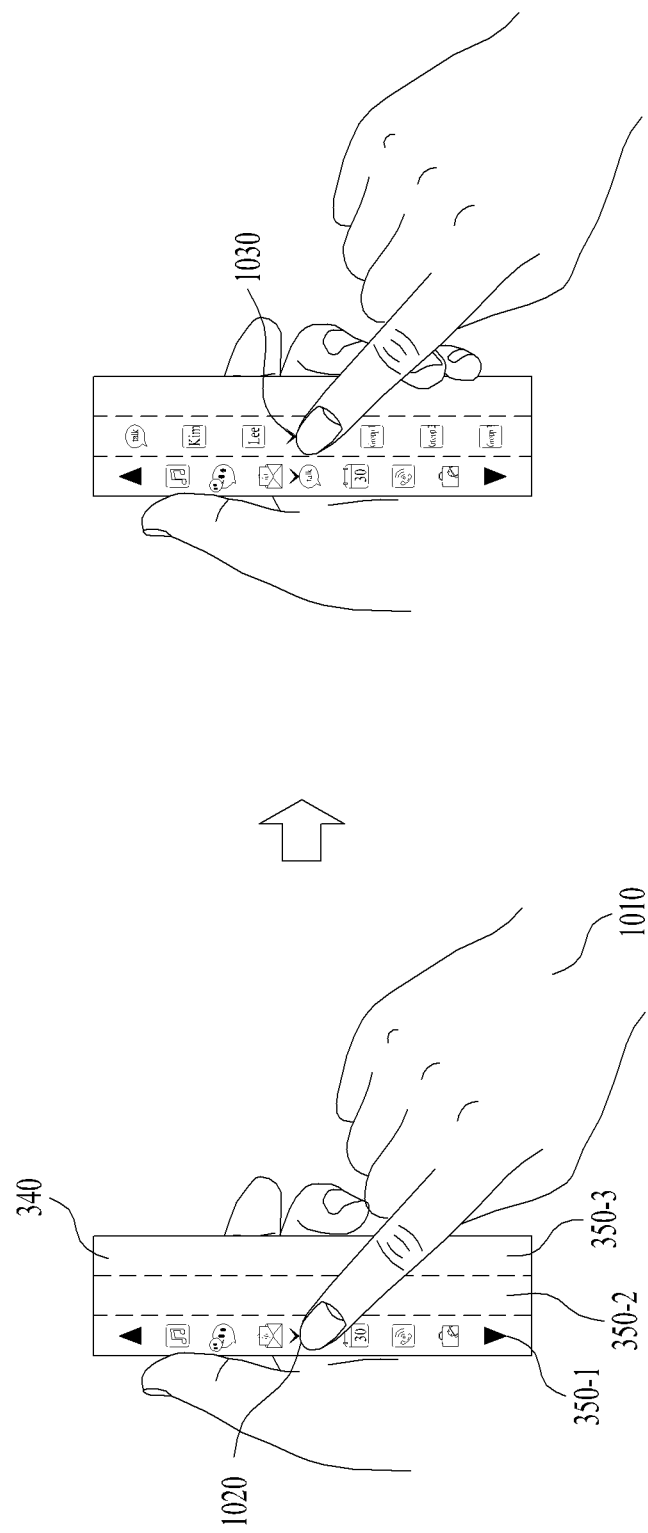

PORTABLE DEVICE AND METHOD OF CONTROLLING THE SAME

This application claims the benefit of the Korean Patent Application No. 10-2014-0192498, filed on Dec. 29, 2014, which is hereby incorporated by reference as if fully set forth herein.

BACKGROUND OF THE INVENTION

Field of the Invention

This specification relates to a portable device and a method for controlling the same.

Discussion of the Related Art

The usage of portable devices using a flexible display is increasing. Portable devices using a flexible display may provide users with a wide display screen. At the same time, the portable device using a flexible display may have a foldable structure. Accordingly, the mobility of the portable device may be increased. Recently, a structure displaying visual information on an edge area (side area) of the portable device by using a flexible display panel or a separate display area has been proposed. At this point, the portable device requires a method for controlling visual information that is displayed on its edge area.

SUMMARY OF THE INVENTION

Accordingly, the present specification is directed to a portable device and a method for controlling the same that substantially obviate one or more problems due to limitations and disadvantages of the related art.

An object of this specification is to provide a portable device having a structure including multiple bodies.

Another object of this specification is to provide a method for displaying visual information on a side area of the portable device.

Yet another object of this specification is to provide a method for displaying an interface on the side area of the portable device, when the portable device is in a folded state, wherein the multiple bodies of the portable device are folded.

Yet another object of this specification is to provide a method for controlling visual information being displayed on a front area of the portable device by using the interface being displayed on the side area of the portable device.

Yet another object of this specification is provide a method for executing an application based upon a triggering signal changing the portable device from the folded state to an unfolded state.

A further object of this specification is to provide a method for configuring a part corresponding to each of the multiple bodies on the side area of the portable device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to an exemplary embodiment of this specification, a portable device including a first body and a second body may be provided. At this point, the portable device may include a display unit configured to display visual information on at least one of a front display area of the first body, a side display area of the first body, a front display area of the second body, and a side display area of the second body. Additionally, the portable device may also include a control input sensing unit configured to detect a control input, a folding sensor unit configured to detect that the first body is folded to the second body, and a processor configured to control the display unit, the control input sensing unit, and the folding sensor unit. At this point, the processor may detect a folded state, wherein the first body is folded to the second body, may display a first interface on a side display area, wherein the first interface is composed of a first part and a second part and includes multiple objects, may detect a first control input selecting a first object included in the first interface, and may display a first application corresponding to the first object, when a first triggering signal changing the portable device from the folded state to an unfolded state is detected. And, at this point, when the first object is located in the first part, the first application may be displayed on the front display area of the first body, and, when the first object is located in the second part, the first application may be displayed on the front display area of a second application.

According to an exemplary embodiment of this specification, a method for controlling a portable device including a first body and a second body may include the steps of detecting a folded state, wherein the first body is folded to the second body, displaying a first interface on a side display area of the portable device, wherein the first interface is composed of a first part and a second part and includes multiple objects, detecting a first control input selecting a first object included in the first interface, and displaying a first application corresponding to the first object, when a first triggering signal changing the portable device from the folded state to an unfolded state is detected. Herein, when the first object is located in the first part, the first application may be displayed on the front display area of the first body, and, when the first object is located in the second part, the first application may be displayed on the front display area of a second application.

It is to be understood that both the foregoing general description and the following detailed description of this specification are exemplary and explanatory and are intended to provide further explanation of the invention as claimed.

BRIEF DESCRIPTION OF THE DRAWINGS

The accompanying drawings, which are included to provide a further understanding of this specification and are incorporated in and constitute a part of this application, illustrate embodiment(s) of this specification and together with the description serve to explain the principle of this specification. In the drawings:

FIG. 8a and FIG. 8b illustrate a method of the portable device for displaying an application according to the exemplary embodiment of this specification;

FIG. 9a to FIG. 9c illustrate a method of the portable device for displaying visual information based upon a threshold time according to the exemplary embodiment of this specification;

FIG. 10a and FIG. 10b illustrate a method of the portable device for displaying visual information on a side area of the portable device according to the exemplary embodiment of this specification.

DETAILED DESCRIPTION OF THE INVENTION

Hereinafter, the exemplary embodiments will be described in detail with reference to the accompanying drawings and the contents indicated in the accompanying drawings. However, the scope of this specification will not be limited to or limited by the exemplary embodiments presented herein.

In addition, although the terms used in this specification are selected from generally known and used terms, the terms used herein may be varied or modified in accordance with the intentions or practice of anyone skilled in the art, or along with the advent of a new technology. Alternatively, in some particular cases, some of the terms mentioned in the description of this specification may be selected by the applicant at his or her discretion, the detailed meanings of which are described in relevant parts of the description herein. Furthermore, it is required that this specification is understood, not simply by the actual terms used but by the meaning of each term lying within.

Additionally, in this specification, terms including numeric expressions, such as first, second, and so on, may be used to describe diverse elements. However, such elements should not be limited by the terms used in this specification. In other words, such terms will be used only to differentiate one element from other elements in this specification, without deviating from the scope and spirit of this specification. Accordingly, a first element may be referred to as a second element, and, similarly, a second element may also be referred to as a first element.

Furthermore, when a part is said to "include" an element, it is to be understood that, unless obviously and clearly noted or specified otherwise within the specification, other elements may be further included instead of excluding the other elements. And, the suffixes "module" and "unit" that are mentioned in the elements used in this specification are merely used individually or in combination for the purpose of simplifying the description of this specification, and this may be realized by the combination of hardware and/or software.

Figure 1:
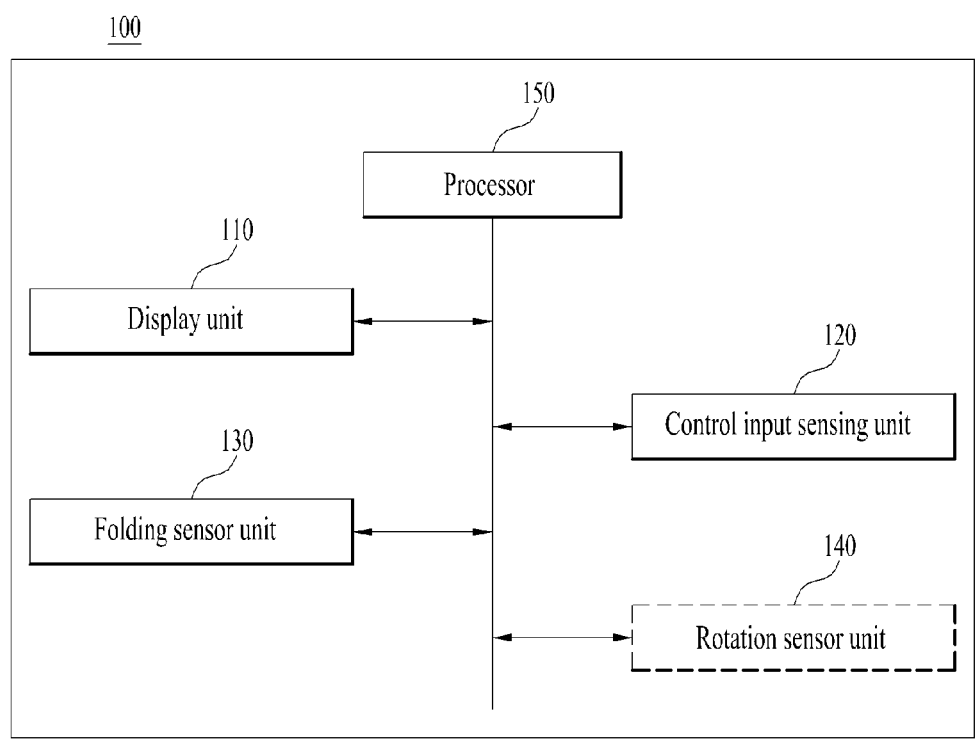
FIG. 1 illustrates a block view of a portable device according to an exemplary embodiment of this specification.

FIG. 1 illustrates a block view of a portable device according to an exemplary embodiment of this specification. The portable device 100 may correspond to a device including a first body and a second body. Additionally, for example, the portable device 100 may correspond to a device including a first body, a second body, and a third body. More specifically, the portable device 100 may have a structure, wherein the body is divided based upon a folding axis. In other words, the portable device 100 may correspond to a device including multiple bodies, and the portable device 100 described in this specification will not be limited only to the exemplary embodiment that will hereinafter be described. Moreover, the exemplary embodiments that will be described as follows may be applied to a device including multiple bodies, and the structure of the device will not be limited only to a two-body structure or a three-body structure. Additionally, the portable device 100 may display visual information on a front display area and a side display area. At this point, in case the portable device 100 includes multiple bodies, the portable device 100 may display the visual information on a front display area and a side display area of each body. This will be described in more detail later on with reference to FIG. 2a to FIG. 2d. Additionally, for example, the portable device 100 may correspond to a flexible device. For example, each body of the portable device may configure an integrated (or combined) structure. At this point, the portable device 100 may distinguish each body based upon a bending axis according to which the portable device 100 is being bent. More specifically, the portable device 100 may be bent by the user. At this point, the portable device 100 may differentiate each body or area (or section) based upon a bending axis and may then respectively display the visual information, which is divided into multiple sections. This will be described in more detail later on with reference to FIG. 3a to FIG. 3d.

The portable device 100 may include a display unit 110, a control input sensing unit 120, a folding sensor unit 130, and a processor 150. Additionally, as an optional element, the portable device 100 may further include a rotation sensor unit 140. At this point, for example, each unit may consist of a configuration element or assembly part configuring the portable device 100. More specifically, each unit may correspond to an independent unit, which is housed to allow the portable device 100 to perform its functions, and, therefore, the units will not be limited only to the above-described exemplary embodiment.

The display unit 110 may be controlled by the processor 150. At this point, when the portable device 100 includes two bodies, the display unit 110 may display the visual information on at least one of a front display area of a first body, a side display area of a first body, a front display area of a second body, and a side display area of a second body. Moreover, in case the portable device 100 is includes three bodies, the display unit 110 may display the visual information on at least one of a front display area of a first body, a side display area of a first body, a front display area of a second body, a side display area of a second body, a front display area of a third body, and a side display area of a third body. More specifically, the display unit 110 may display the visual information on the front display area and the side display area of each body, and this will not be limited only to the above-described exemplary embodiment. At this point, for example, the front display area and the side display area may correspond to areas that can be differentiated by at least one edge. More specifically, the front display area may correspond to an area displaying the visual information along a forward direction (on the front direction) of the portable device 100. At this point, the side display area may correspond to a direction forming a 90-degree angle (or right angle) with the front direction of the portable device 100. More specifically, the front display area may be set on a front surface of the portable device 100, and the side display area may be set on a side surface of the portable device 100. At this point, the front display area and the side display area are differentiated from one another by an edge of the portable device 100. Additionally, in another example, the front display area may be set on the front surface of the portable device 100. And, the side display area may be set on the side surface of the portable device 100 while having a consistent curvature. More specifically, for example, a flexible display panel may be included inside the portable device 100. At this point, the display panel may be housed inside the portable device 100 in a bent form. More specifically, among the display panel, an area (or section) corresponding to the front display area may be in a state having no curvature (i.e., a non-curved state). Additionally, among the display panel, an area (or section) corresponding to the side display area may be in a state having a curvature (i.e., a curved state). At this point, for example, a boundary between the front display area and the side display area may be determined by one edge. Additionally, in another example, the boundary between the front display area and the side display area may be variably configured by the user or the processor 150, and this will not be limited only to the above-described exemplary embodiment. More specifically, the display unit 110 may display the visual information on the front display area and the side display area, which can be differentiated from one another, and this will not be limited only to the above-described exemplary embodiment.

Additionally, for example, as an integrated unit, the display unit 110 may correspond to a flexible unit 110. At this point, the display unit 110 may be configured as a front area and a side area based upon a folding axis according to which the display unit 110 is being folded. This will be described in more detail later on with reference to FIG. 3*a* to FIG. 3*d*.

The portable device 100 may further include a control input sensing unit 120. At this point, the control input sensing unit 120 may deliver a user input or an environment, which is recognized by the device, to the processor 150 by using at least one sensor being installed in the portable device 100. More specifically, the control input sensing unit 120 may sense a control input of the user by using at least one sensor being installed in the portable device 100. Herein, the at least one sensing means may include diverse sensing means for sensing the control input, such as a touch sensor, a fingerprint sensor, a motion sensor, a proximity sensor, illumination sensor, voice recognition sensor, pressure sensor, and so on. The control input sensing unit 120 collectively refers to the above-described diverse sensing means, and each of the above-described sensors may be included in the portable device 100 as a separate element, or a combination of at least one of the above-described sensors may be included in the portable device 100. More specifically, the control input sensing unit 120 may correspond to a unit configured to sense a control input of the user, and this will not be limited only to the above-described exemplary embodiment. Additionally, for example, as a gesture input, the control input may correspond to diverse contact-based inputs or non-contact based inputs. Moreover, the control input may correspond to an input being inputted by an input device or may correspond to an input being inputted by voice or audio input, and this will not be limited only to the above-described exemplary embodiment. Additionally, for example, the control input sensing unit 120 may correspond to an element that is combined with the display unit 110. For example, the display unit 110 may correspond to a touch sensitive display unit 110.

The portable device 100 may include a folding sensor unit 130. At this point, in case the portable device 100 includes two bodies, the folding sensor unit 130 may detect that a first body and a second body of the portable device 100 are being folded based upon the folding axis. Additionally, in case the portable device 100 includes three bodies, the folding sensor unit 130 may detect whether or not a first body, a second body, and a third body of the portable device 100 are being folded based upon the folding axis. More specifically, in case the portable device 100 includes three bodies, the first body may be adjacent to the second body. And, the second body may be adjacent to the third body. At this point, the first body and the second body may be folded based upon a first folding axis. And, the second body and the third body may be folded based upon a second folding axis. More specifically, the portable device 100 may detect whether or not neighboring bodies are being folded. Additionally, in case the portable device 100 includes multiple bodies, the folding sensor unit 130 may detect whether or not the multiple bodies being adjacent to one another are being folded, and this will not be limited only to the above-described exemplary embodiment. Additionally, the folding sensor unit 130 may detect whether or not the portable device 100 is being folded by using a distance between the folded bodies or an angle formed between the folded bodies. More specifically, when a distance between the first body and the second body is equal to or less than a first threshold distance, the folding sensor unit 130 may detect that the first body and the second body are being folded. At this point, the first threshold distance may correspond to a threshold distance that is used for detecting whether or not the bodies of the portable device 100 are being folded, and the first threshold distance may have a predetermined difference range. Additionally, for example, when an angle between the first body and the second body is equal to or less than a first threshold angle, the folding sensor unit 130 may detect that the first body and the second body are being folded. At this point, the first threshold angle may correspond to a threshold angle that is used for detecting whether or not the bodies of the portable device 100 are being folded, and the first threshold angle may have a predetermined difference range. More specifically, the folding sensor unit 130 may detect whether or not the bodies of the portable device 100 are being folded by using a distance or angle between the corresponding bodies, and this will not be limited only to the above-described exemplary embodiments. Additionally, the folding sensor unit 130 may deliver information on the folded state of the portable device 100 to the processor 150. Accordingly, the processor 150 may detect the folded state of the portable device 100. And, the folding sensor unit 130 may detect the folded state of the flexible device, and this will not be limited only to the above-described exemplary embodiment.

The portable device 100 may include a rotation sensor unit 140 as an optional configuration element. The rotation senor unit 140 may include at least one sensing means, such as a gyroscopic sensor, an acceleration sensor, a gravity sensor, and the rotation sensor unit 140 may detect whether or not the portable device 100 is being rotated along a rotation axis of the portable device 140. At this point, for example, the rotation axis may be configured based upon a direction of the front surface of the portable device 100. More specifically, the rotation axis of the portable device 100 may correspond to a facing direction of the front surface of the portable device. At this point, the folding sensor unit 130 may detect that the portable device 100 is being folded at an angle equal to or greater than the first threshold angle based upon the front surface direction of the portable device 100. At this point, the portable device 100 may display a first interface on the side surface area of the portable device 100. At this point, the first threshold angle may correspond to a threshold angle that is used for detecting whether or not the bodies of the portable device 100 are being folded, and the first threshold angle may have a predetermined difference range. Additionally, for example, in case the direction of the front surface of the portable device 100 corresponds to an opposite direction of the ground, the rotation angle may be equal to 0. At this point, the first threshold angle may correspond to a 90-degree angle (or right angle) or an angle within a predetermined difference range from 90 degrees. More specifically, in case the front surface direction of the portable device 100 forms a 90-degree angle with the ground, the rotation sensor unit 140 may detect that the portable device 100 is being rotated. Accordingly, the first interface may be selectively (or optionally) displayed only when the user views the side display area by rotating the portable device 100.

The processor 150 may correspond to a unit controlling at least one of the display unit 110, the control input sensing unit 120, and the folding sensor unit 130. Additionally, the processor 150 may further control the rotation sensor unit 140.

More specifically, the processor 150 may detect the folded state of the portable device 100 by using the folding sensor unit 130. At this point, in case the portable device 100 includes two bodies, the folded state may correspond to a state, wherein the first body and the second body are folded so as to overlap one another. Moreover, in case the portable device 100 includes three bodies, the folded state may correspond to a state, wherein the first body and the second body are folded so as to overlap one another, and wherein the second body and the third body are folded so as to overlap one another. More specifically, the folded state may correspond to a state wherein all of the multiple bodies are folded by overlapping one another. At this point, the processor 150 may display a first interface including multiple objects on the side display area by using the display unit 110. At this point, the side display area may correspond to a side surface area of the portable device 100, when the portable device 100 is in a folded state. More specifically, when the portable device 100 is in a folded state, the side surface of each body may be adjacent to one another. At this point, the side display area may be set on side surfaces of the bodies that are adjacent to one another. For example, in case the portable device 100 includes two bodies, the side display area may be set of a combination of the side display area of the first body and the side display area of the second body. Additionally, for example, in case the portable device 100 includes three bodies, the side display area may be set of a combination of the side display area of the first body, the side display area of the second body, and the side display area of the third body. At this point, the side display area of the second body may correspond to an area adjacent to the side display area of the first body. And, the side display area of the third body may correspond to an area adjacent to the side display area of the second body. More specifically, in case the portable device 100 is changed to a folded state, the side display area may be set of a combination of the side display areas of bodies that are adjacent to one another. Additionally, the portable device 100 may display the first interface on the side display area. At this point, the first interface may be set of multiple parts. More specifically, in case the portable device 100 includes two bodies, a first part of the first interface may be set as the side display area of the first body. And, a second part of the first interface may be s as the side display area of the second body. Additionally, for example, the portable device 100 may display the visual information on the side display area by arbitrarily dividing the display area to a first part and a second part, and this will not be limited only to the above-described exemplary embodiment. Additionally, when the portable device 100 includes three bodies, the first part may be set on the side display area of the first body. Also, the second part may be set on the side display area of the second body. And, the third part may be set on the side display area of the third body. Additionally, for example, the portable device 100 may display the visual information on the side display area by arbitrarily dividing the display area to a first part, a second part, and a third part, and this will not be limited only to the above-described exemplary embodiment.

Additionally, for example, the processor 150 may display a first interface including multiple objects. At this point, the multiple objects may correspond to an application that is being executed and its related objects. For example, the multiple objects may correspond to an icon respective to each application. Additionally, for example, the multiple objects may correspond to multiple sets of content included in one application. For example, in case of a messenger application, the multiple objects may each correspond to a chat window for exchanging messages. More specifically, the multiple objects may correspond to objects that are related to an application or content that is being executed by the portable device 100, and this will not be limited only to the above-described exemplary embodiment.

At this point, the processor 150 may detect a first control input selecting a first object of the first interface by using the control input sensing unit 120. At this point, the first control input may correspond to a touch input. Thereafter, the processor 150 may detect a first triggering signal, which changes the portable device from the folded state to the unfolded state by using the folding sensing unit 120. At this point, for example, the unfolded state corresponds to a state when each body of the portable device 100 is unfolded to be in a flat state. Additionally, the first triggering signal may correspond to a signal being delivered from the folding sensor unit 130. In case the processor 150 detects the first triggering signal, the processor 150 may display a first application corresponding to the first object based upon the first control input. At this point, for example, the portable device 100 may include two bodies. At this point, if the first object is located in the first part of the first interface, the portable device 100 may display a first application in the front display area of the first body. Additionally, for example, if the first object is located in the second part of the first interface, the portable device 100 may display a first application in the front display area of the second body. More specifically, the first part may correspond to a part respective to the front display area of the first body, and the second part may correspond to a part respective to the front display area of the second body. In yet another example, the portable device 100 may include three bodies. At this point, the first interface may include a first part, a second part, and a third part. At this point, when the first object is located in the third part, the portable device 100 may display the first application in the front display area of the third body. More specifically, the portable device 100 may display an application on the front display area depending upon whether or not an object located in the part respective to each body is being selected.

Additionally, for example, the portable device 100 may include multiple bodies, and, in the above-described exemplary embodiment, the same principle may be equally applied regardless of the types of the bodies included in the portable device 100. More specifically, if the portable device 100 includes two bodies, the portable device 100 may display an interface including two parts. Additionally, if the portable device 100 includes three bodies, the portable device 100 may display an interface including three parts. Hereinafter, an exemplary embodiment of a device including three bodies will be described in detail, and this principle may be equally applied to a portable device including two bodies.

Additionally, the above-described elements may be included in the portable device 100 as separate elements or may be included as an integrated element consisting of at least one or more of the above-described elements.

FIG. 2a to FIG. 2d illustrate a method of folding the portable device according to an exemplary embodiment of this specification. The portable device 100 may include multiple bodies.

Figure 2A:
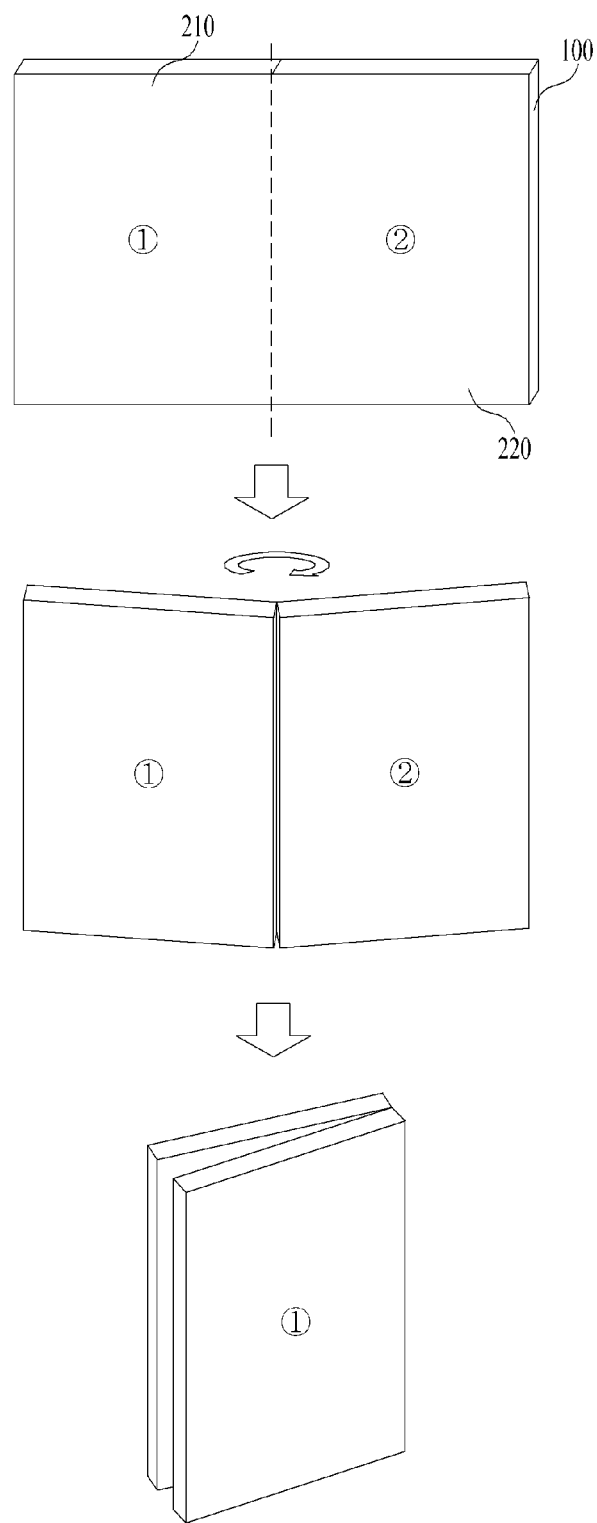
FIG. 2a to FIG. 2d illustrate a method of folding the portable device according to an exemplary embodiment of this specification.

At this point, for example, referring to FIG. 2a, the portable device 100 may include two bodies. At this point, the two bodies may be folded based upon one fixed folding axis. More specifically, the portable device 100 may include a first body 210 and a second body 220. At this point, for example, the portable device 100 may be folded based upon a first folding axis, which is fixed between the first body 210 and the second body 220. At this point, for example, in case the portable device 100 is folded, a back surface of the first body 210 may overlap with a back surface of the second body 220. More specifically, the portable device 100 may fold its bodies, so that the back surfaces of the bodies on which the visual information is not displayed can be overlapped.

Figure 2B:
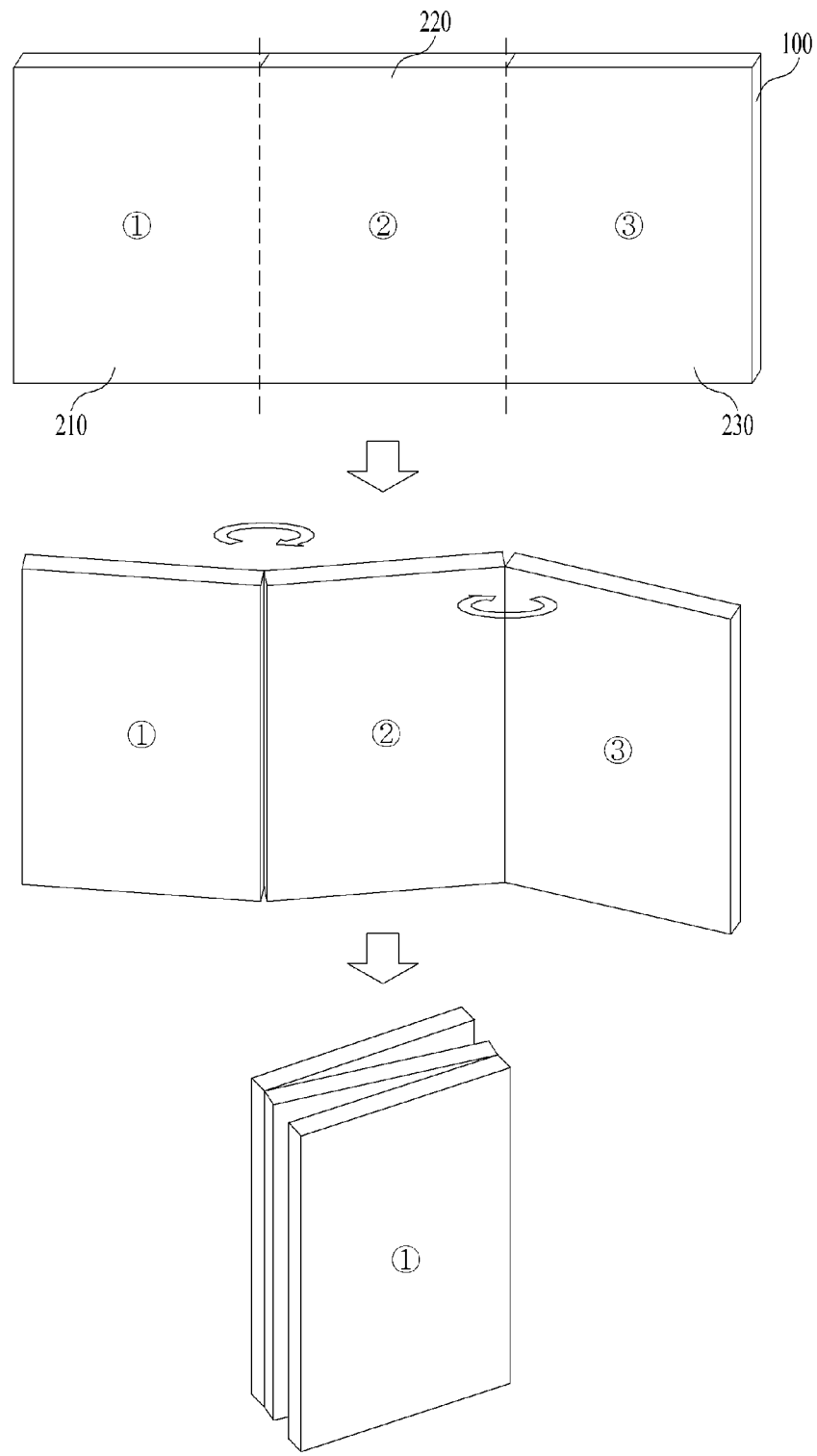

Additionally, referring to FIG. 2b, the portable device 100 may include three bodies. At this point, for example, the portable device 100 may include a fixed first folding axis and a fixed second folding axis. At this point, the first folding axis may correspond to a folding axis located between the first body 210 and the second body 220. Additionally, the second folding axis may correspond to a folding axis located between the second body 220 and the third body 230. In yet another example, in case the portable device 100 is folded, a back surface of the first body 210 may be overlapped with a back surface of the second body 220. At the same time, a front surface of the second body 220 may be overlapped with a front surface of the third body 230. More specifically, the portable device 100 may be folded by having each of the three bodies face directions opposite to one another.

Figure 2C:
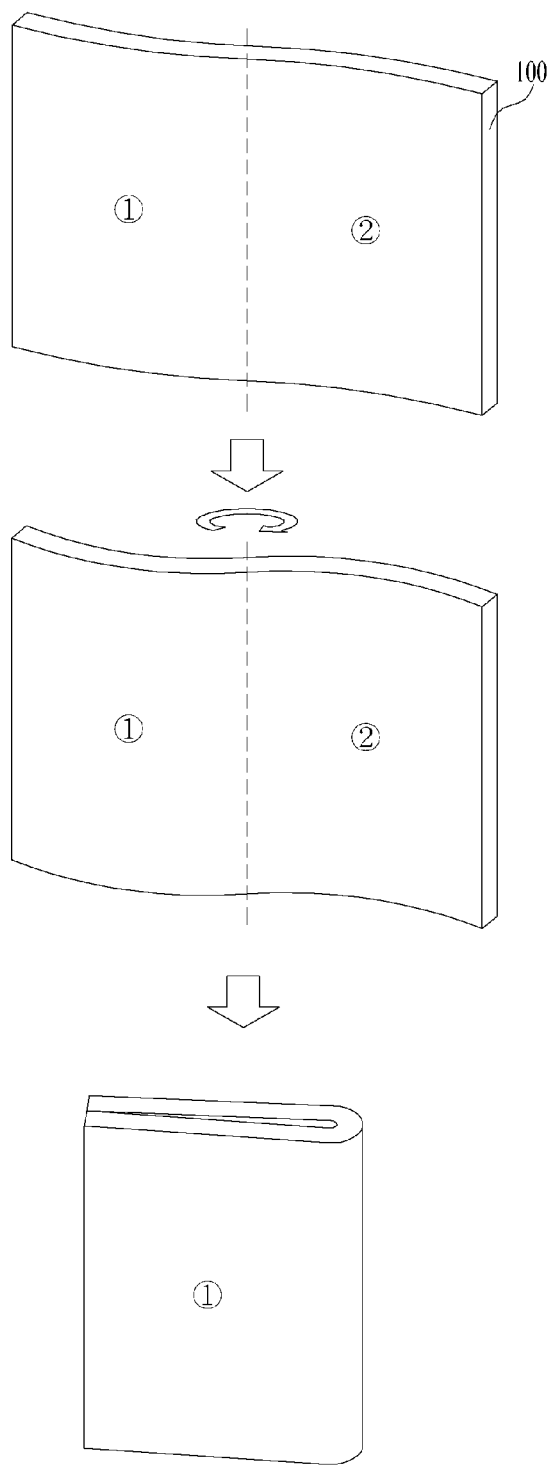
Figure 2D:
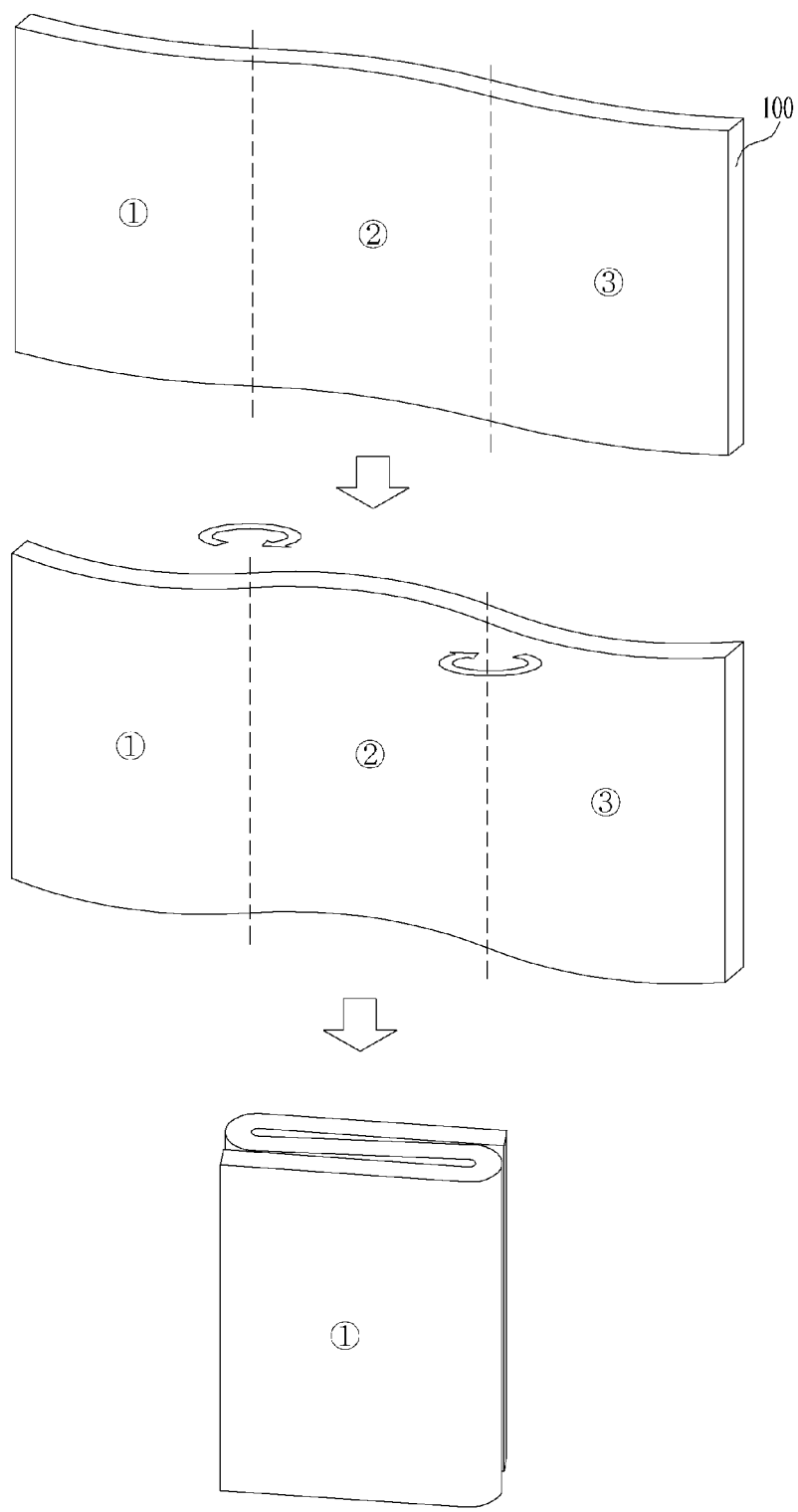

Additionally, referring to FIG. 2c and FIG. 2d, the portable device 100 may correspond to a flexible device. At this point, for example, the portable device 100 may be folded based upon a folding axis that is not fixed. More specifically, the folding axis may be arbitrarily selected from the portable device 100 by the user. At this point, in case the portable device 100 detects the folding axis, based upon the folding axis, the portable device 100 may be folded by determining one area as the first body and another area as the second body. Additionally, the portable device 100 may be folded based upon two arbitrarily determined folding axes. At this point, for example, two folding axes may be arbitrarily determined, and, based upon the folding axes, the portable device 100 may be divided into a first body, a second body, and a third body. At this point, the folding method is as described above.

FIG. 3a to FIG. 3d illustrate a method of the portable device for displaying visual information on its front area and side area according to the exemplary embodiment of this specification. The portable device 100 may display visual information on a front display area and a side display area of each body.

Figure 3A:
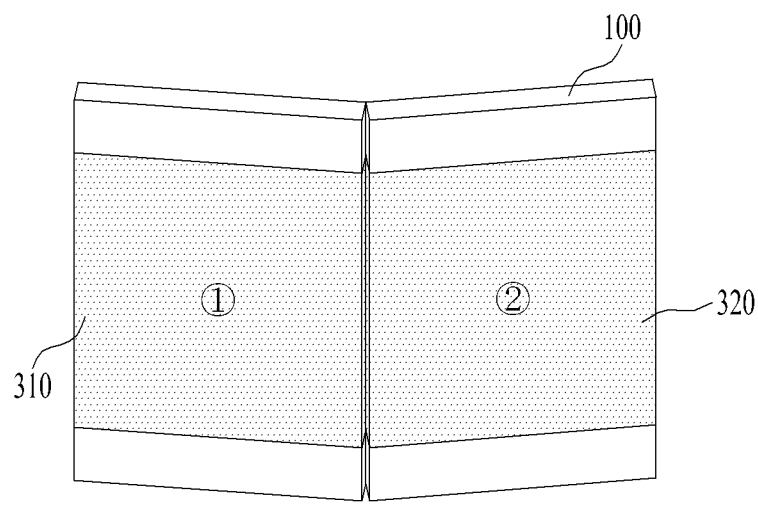
FIG. 3a to FIG. 3d illustrate a method of the portable device for displaying visual information on its front area and side area according to the exemplary embodiment of this specification.
Figure 3A:
Figure 3A:
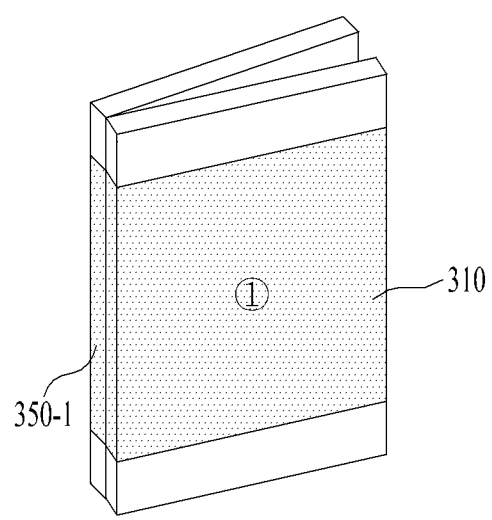

For example, referring to FIG. 3a, when the portable device 100 includes two bodies, the portable device 100 may display visual information on a front display area and an exposed side display area. For example, in case the portable device 100 is folded, the portable device 100 may display the visual information on the front surface area. At this point, for example, the front surface area may correspond to any one of a front display area of the first body 310 and a front display area of the second body 320. Additionally, for example, the portable device 100 may display visual information on a side display area 350-1. At this point, the side display area 350-1 may be set by a combination of a side display area of the first body 310 and a side display area of the second body 320.

Figure 3B:
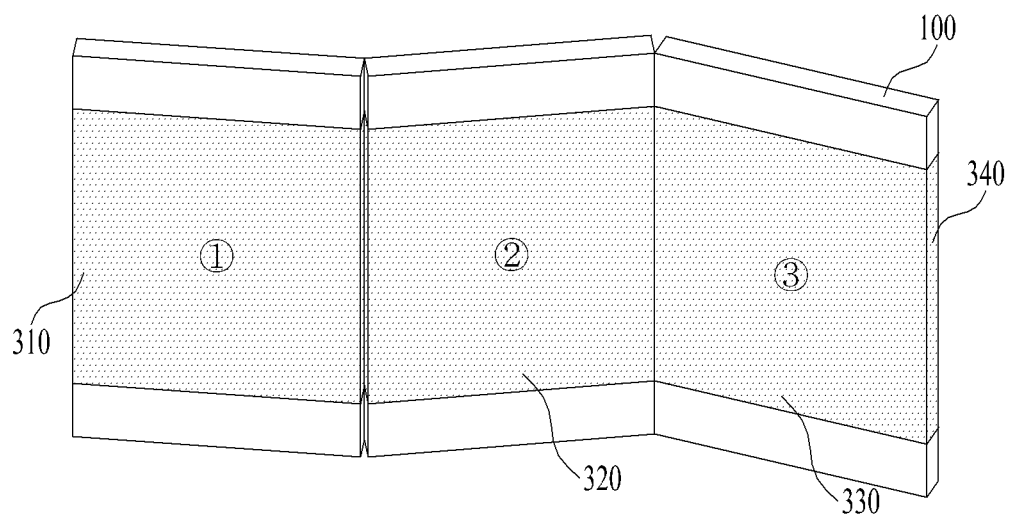
Figure 3B:
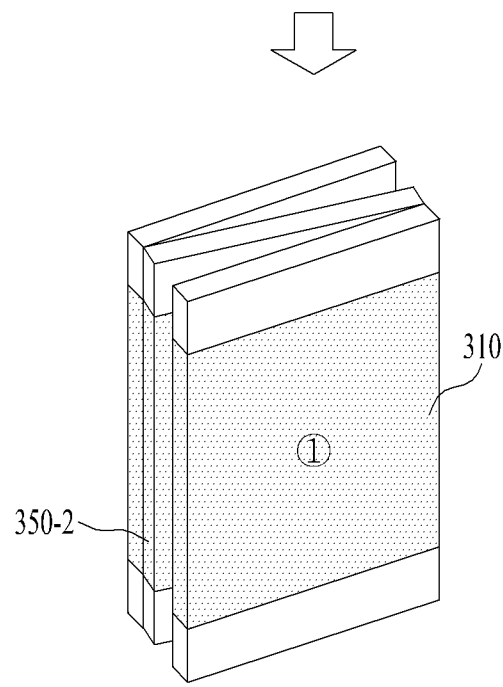

In yet another example, referring to FIG. 3b, when the portable device 100 includes three bodies, the portable device 100 may display visual information on a front display area and an exposed side display area. For example, in case the portable device 100 is folded, the portable device 100 may display the visual information on the front surface area. At this point, for example, the front surface area may correspond to any one of a front display area of the first body 310, a front display area of the second body 320, and a front display area of the third body 330. More specifically, the front surface area may correspond to an area located on a front side of the portable device 100. Additionally, for example, the portable device 100 may display visual information on a side display area 350-2. At this point, the side display area 350-2 may be set by a combination of a side display area of the first body 310, a side display area of the second body 320, and a side display area of the third body 330. More specifically, in case the portable device 100 is folded, the portable device 100 may set the entire side surfaces of each body as the side display area.

Figure 3C:
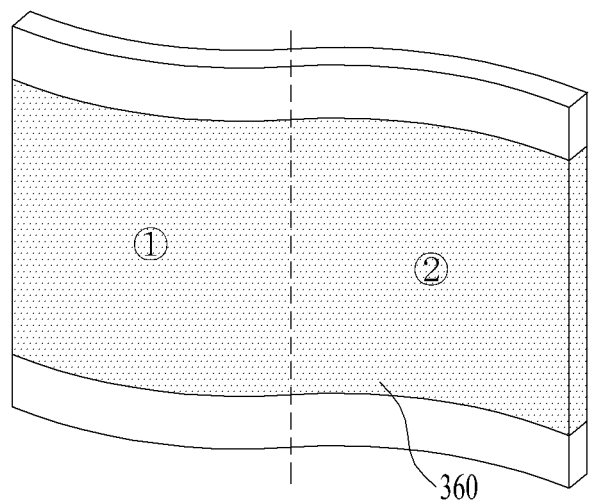
Figure 3C:
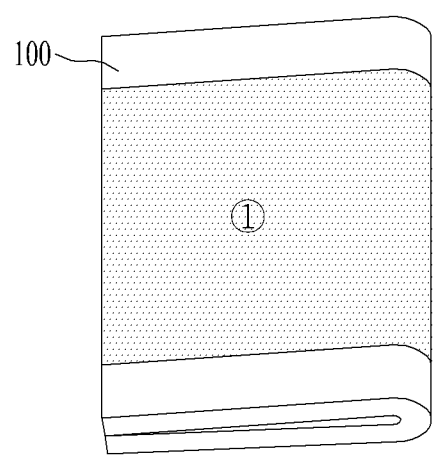
Figure 3D:
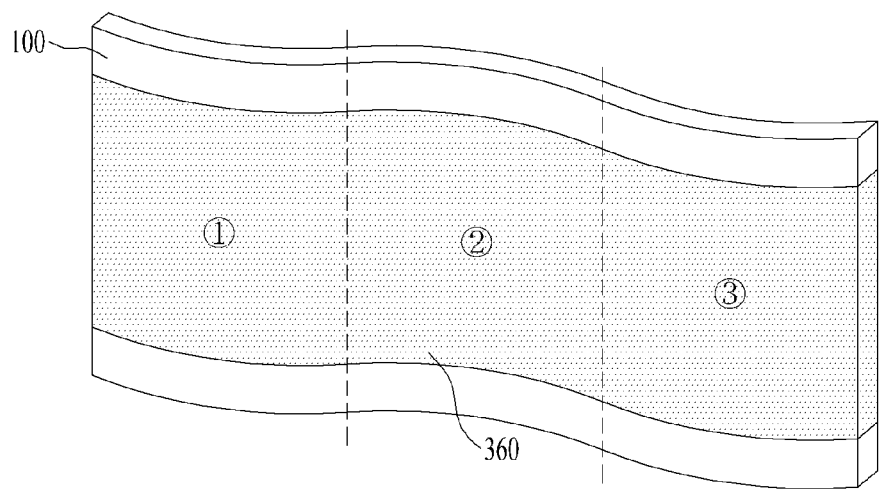
Figure 3D:
Figure 3D:
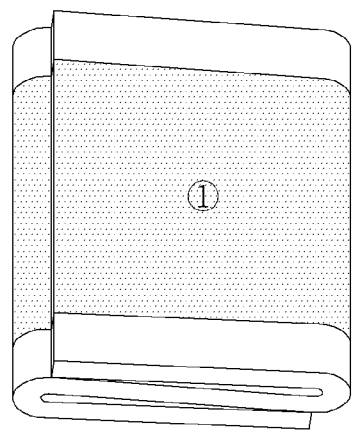

In yet another example, referring to FIG. 3c and FIG. 3d, the portable device 100 may correspond to a flexible device. At this point, for example, in case the portable device 100 is folded, based upon the folding axis, the portable device 100 may determine an area within a first threshold distance as the side display area. Additionally, based upon the folding axis, the portable device 100 may determine an area outside of the first threshold distance as the front display area. More specifically, when the portable device 100 is in a folded state, an area located on a front side of the folded portable device 100 may be determined as the front display area. Additionally, the portable device 100 may determine an area adjacent to the folding axis and having a consistent curvature as the side display area. Moreover, in case the portable device 100 has a predetermined thickness, the portable device 100 may determine a side surface based upon the thickness as the side display area. More specifically, when the portable device 100 is in a folded state, a side surface that is created in this state may function as the side display area, thereby displaying the visual information, and this will not be limited only to the above-described exemplary embodiment.

Figure 4A:
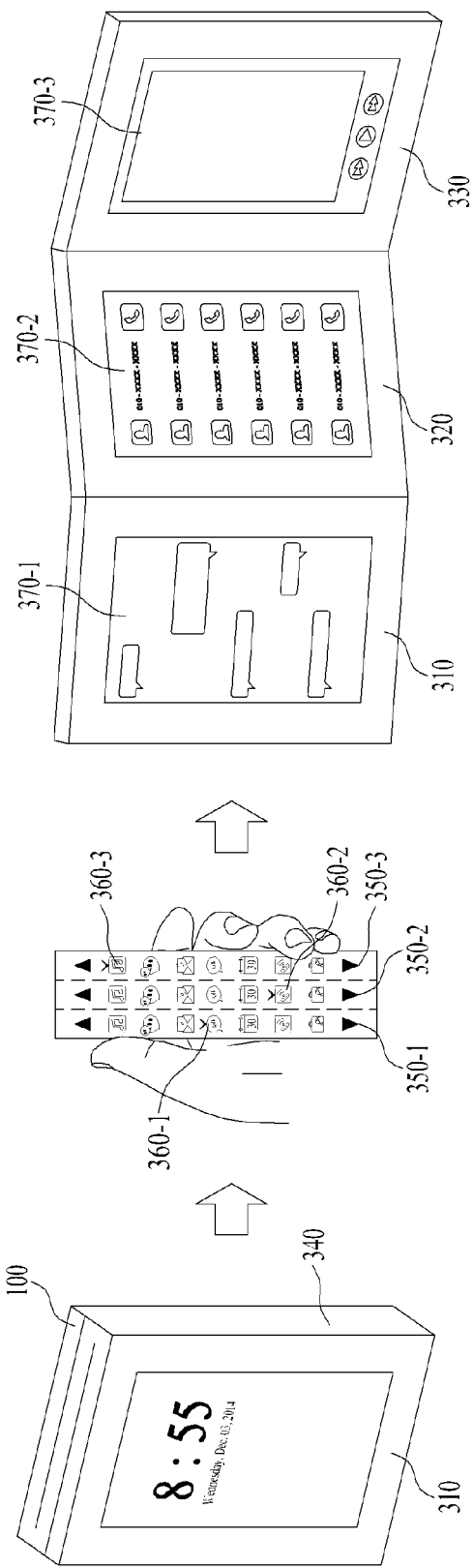
FIG. 4a and FIG. 4b illustrates a method of the portable device for executing multiple applications according to the exemplary embodiment of this specification.
Figure 4B:
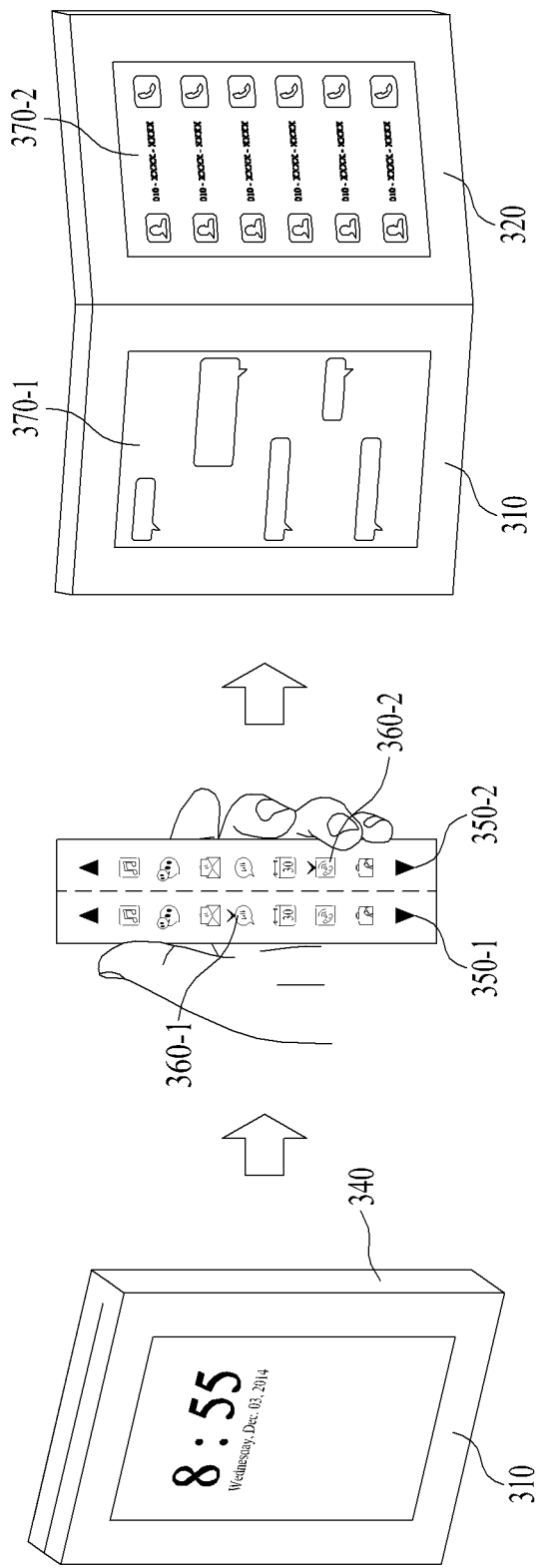

FIG. 4a and FIG. 4b illustrates a method of the portable device for executing multiple applications according to the exemplary embodiment of this specification. While in a folded state, the portable device 100 may display a first interface on a side display area 340. At this point, for example, when the portable device 100 rotates to a first threshold angle or more, the portable device 100 may display the first interface. More specifically, when the user faces into the side display area 340 by holding the portable device 100 upward, the first interface may be displayed.

Additionally, the first interface may include multiple objects 360-1, 360-2, and 360-3. At this point, for example, the multiple objects may correspond to icons of respective applications. Additionally, the first interface may include multiple parts 350-1, 350-2, and 350-3. At this point, the first part 350-1 may correspond to a part respective to a front display area of the first body 310. Also, the second part 350-2 may correspond to a part respective to a front display area of the second body 320. And, the third part 350-3 may correspond to a part respective to a front display area of the third body 330.

At this point, for example, the portable device 100 may detect a control input selecting one of the multiple objects. Thereafter, the portable device 100 may detect a first triggering signal changing the portable device 100 from a folded state to an unfolded state. At this point, when the selected object is located on the first part 350-1, the portable device 100 may display an application respective to the selected object on the front display area of the first body 310. Also, when the selected object is located on the second part 350-2, the portable device 100 may display an application respective to the selected object on the front display area of the second body 320. And, when the selected object is located on the third part 350-3, the portable device 100 may display an application respective to the selected object on the front display area of the third body 330. More specifically, the portable device 100 may set a display area of the application based upon the location of the selected object.

In yet another example, referring to FIG. 4*a*, the portable device 100 may detect a control input selecting a first object 360-1 of the first interface. Also, the portable device 100 may detect a control input selecting second object 360-2 of the first interface. And, the portable device 100 may detect a control input selecting a third object 360-3 of the first interface. At this point, the first object 360-1 may be located on the first part 350-1. Also, the second object 360-2 may be located on the second part 350-2. And, the third object 360-3 may be located on the third part 350-3. Thereafter, in case the portable device 100 detects that the portable device 100 is being changed from the folded state to the unfolded state, the portable device 100 may display a first application 370-1 corresponding to the first object 360-1 on a front display area of the first body 310. At the same time, the portable device 100 may display a second application 370-2 corresponding to the second object 360-2 on a front display area of the second body 320. And, simultaneously, the portable device 100 may display a third application 370-3 corresponding to the third object 360-3 on a front display area of the third body 330. More specifically, the portable device 100 may display each of the selected multiple objects on the respective display area.

Additionally, referring to FIG. 4*b*, the portable device 100 may include two bodies. At this point, the portable device 100 may detect a control input selecting the first object 360-1 located on the first part 350-1. And, the portable device 100 may detect a control input selecting the second object 360-2 located on the second part 350-2. Thereafter, when the portable device 100 detects that the portable device 100 is being changed from the folded state to the unfolded state, the portable device 100 may display the first application 370-1 corresponding to the first object 360-1 on the front display area of the first body 310. And, at the same time, the portable device 100 may display the second application 370-2 corresponding to the second object 360-2 on the front display area of the second body 320.

In the following exemplary embodiment, although description will be made on a portable device 100 including three bodies, the same principle may be applied to a portable device 100 including two bodies.

Figure 5:
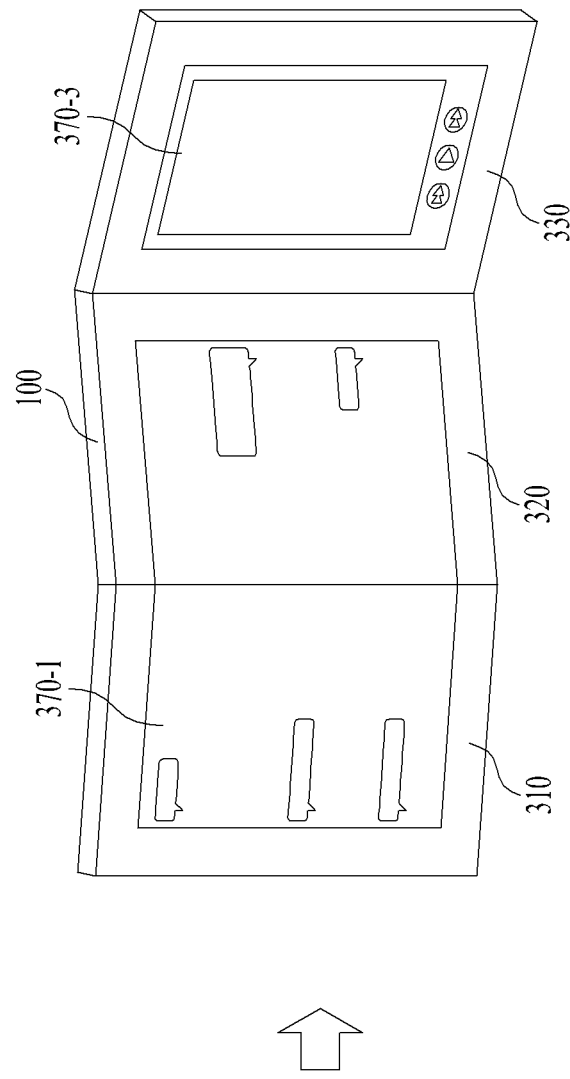
FIG. 5 illustrates a method of the portable device for executing multiple applications according to the exemplary embodiment of this specification.
Figure 5:
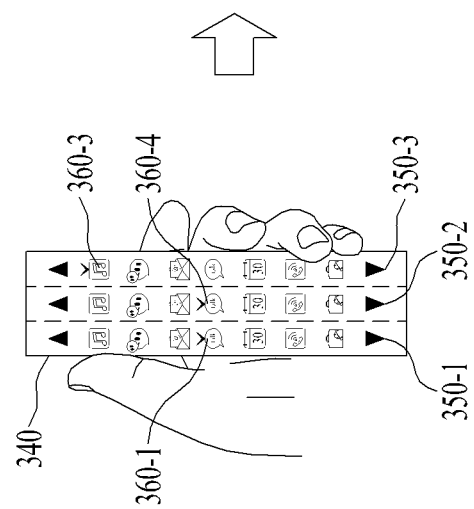

FIG. 5 illustrates a method of the portable device for executing multiple applications according to the exemplary embodiment of this specification. The portable device 100 may include a first interface in the side display area 340. At this point, the first interface may include multiple objects. Additionally, the first interface may include a first part 350-1, a second part 350-2, and a third part 350-3. At this point, for example, the portable device 100 may independently display multiple objects on the first part 350-1, the second part 350-2, and the third part 350-3. At this point, the portable device 100 may detect a control input selecting a first object 360-1, in the first part 350-1. Also, the portable device 100 may detect a control input selecting a second object 360-2, in the second part 350-2. And, the portable device 100 may detect a control input selecting a third object 360-3, in the third part 350-3. Thereafter, the portable device 100 may detect that the portable device 100 is being changed from the folded state to the unfolded state. At this point, for example, the first object 360-1 and the second object 360-2 may correspond to objects respective to the same first application 370-1. More specifically, a first application 370-1 corresponding to the first object 360-1 and a second application 370-2 corresponding to the second object 360-2 may correspond to the same application. At this point, the portable device 100 may display the first application on the front display area of the first body 310 and on the front display area of the second body 320. More specifically, the portable device 100 may display the first application on the front display area of the first body 310 and on the front display area of the second body 320 by dividing the first application into two sections. Furthermore, the portable device 100 may display a third application on the front display area of the third body 330.

Figure 6:
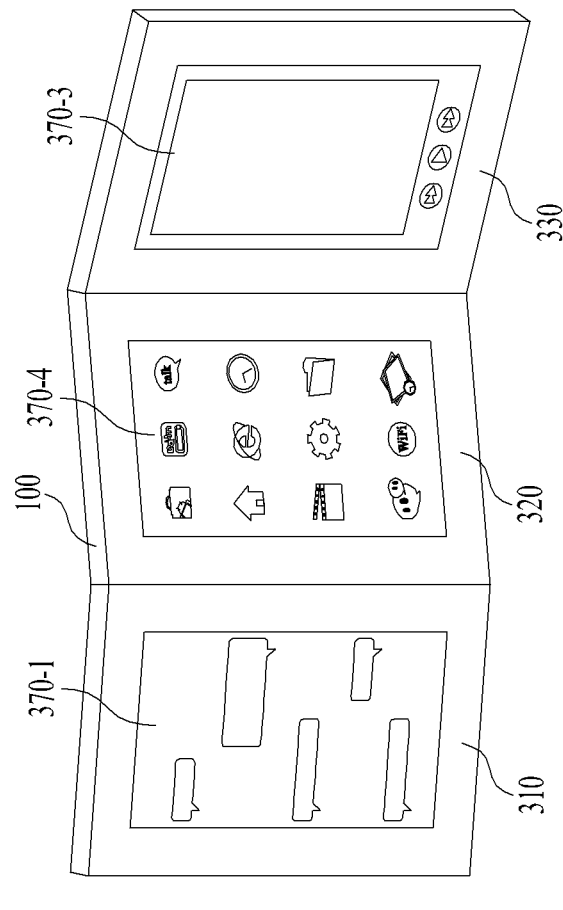
FIG. 6 illustrates a method of the portable device for executing multiple applications according to the exemplary embodiment of this specification.
Figure 6:
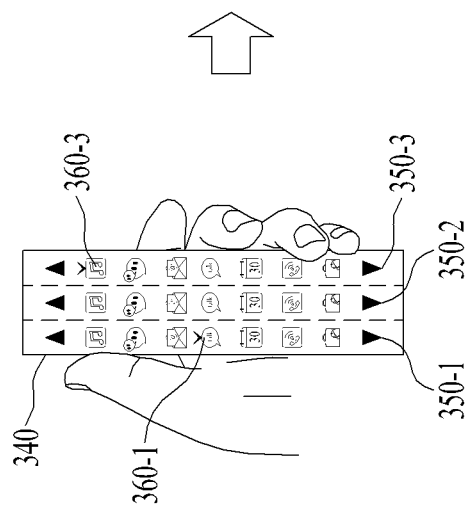

FIG. 6 illustrates a method of the portable device for executing multiple applications according to the exemplary embodiment of this specification. The portable device 100 may display multiple objects on the first interface, as described above in FIG. 5. At this point, the portable device 100 may detect a control input selecting a first object 360-1, in the first part 350-1. Subsequently, the portable device 100 may detect a control input selecting a third object 360-3, in the third part 350-3. Thereafter, the portable device 100 may detect that the portable device 100 is being changed from the folded state to the unfolded state. More specifically, the user may select an object only in the first part 350-1 and the third part 350-3, and the user may not select any object in the second part 350-2. At this point, the portable device 100 may display a first application 370-1 on the front display area of the first body 310. Additionally, the portable device 100 may display a third application 370-3 on the front display area of the third body 330. At this point, the portable device 100 may display a second interface 370-4 on the second body 320. More specifically, in case the portable device 100 fails to detect a control input selecting an object, in the second part 350-2, instead of displaying the second application on the front display area of the second body 320, the portable device 100 may display the second interface 370-4 on the front display area of the second body 320. At this point, for example, the second interface 370-4 may correspond to any one of a Home screen interface and a menu interface. Additionally, for example, the second interface 370-4 may correspond to an interface, which is predetermined by the user or the processor 150, and this will not be limited only to the above-described exemplary embodiment. Accordingly, the user may selectively (or optionally) display the application on any one of the multiple bodies.

Figure 7:
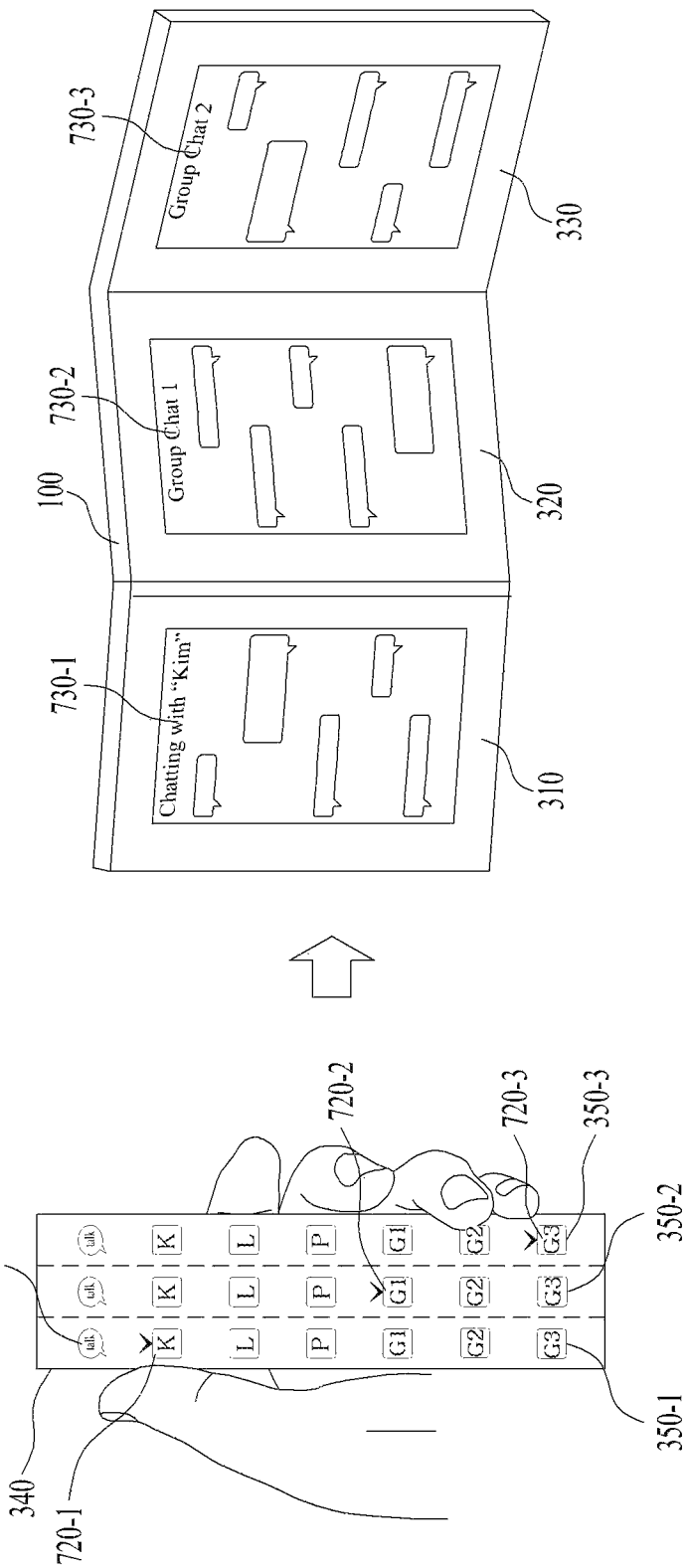
FIG. 7 illustrates a method of the portable device for executing multiple sets of content in one application according to the exemplary embodiment of this specification.

FIG. 7 illustrates a method of the portable device for executing multiple sets of content in one application according to the exemplary embodiment of this specification. The portable device 100 may display a first interface including multiple objects on the side display area 340. At this point, the first interface may correspond to an interface respective to a first application. Additionally, the multiple objects may each correspond to an object related to content being executed in the first application. At this point, for example, the portable device 100 may display an icon 710 related to the first application in the first interface. Additionally, the portable device 100 may detect a control input selecting a first object 720-1, in the first part 350-1. At this point, the first object 720-1 may correspond to an object related to the first content 730-1, which is being executed in the first application. Additionally, the first content 730-1 may correspond to visual information including at least one of image information, text information, and audio information. Also, the portable device 100 may detect a control input selecting a second object 720-2, in the second part 350-2. At this point, the second object 720-2 may correspond to content related to the second content 730-2. Moreover, the portable device 100 may detect a control input selecting a third object 720-3, in the third part 350-3. At this point, the third object 720-3 may correspond to content related to the third content 730-3. Thereafter, the portable device 100 may detect a first triggering signal changing the portable device 100 from a folded state to an unfolded state. At this point, the portable device 100 may display the first content 730-1 on the front display area of the first body 310. Also, the portable device 100 may display the second content 730-2 on the front display area of the second body 320. And, the portable device 100 may display the third content 730-3 on the front display area of the third body 330. More specifically, the portable device 100 may selectively (or optionally) display multiple sets of content respective to one application.

Figure 8B:
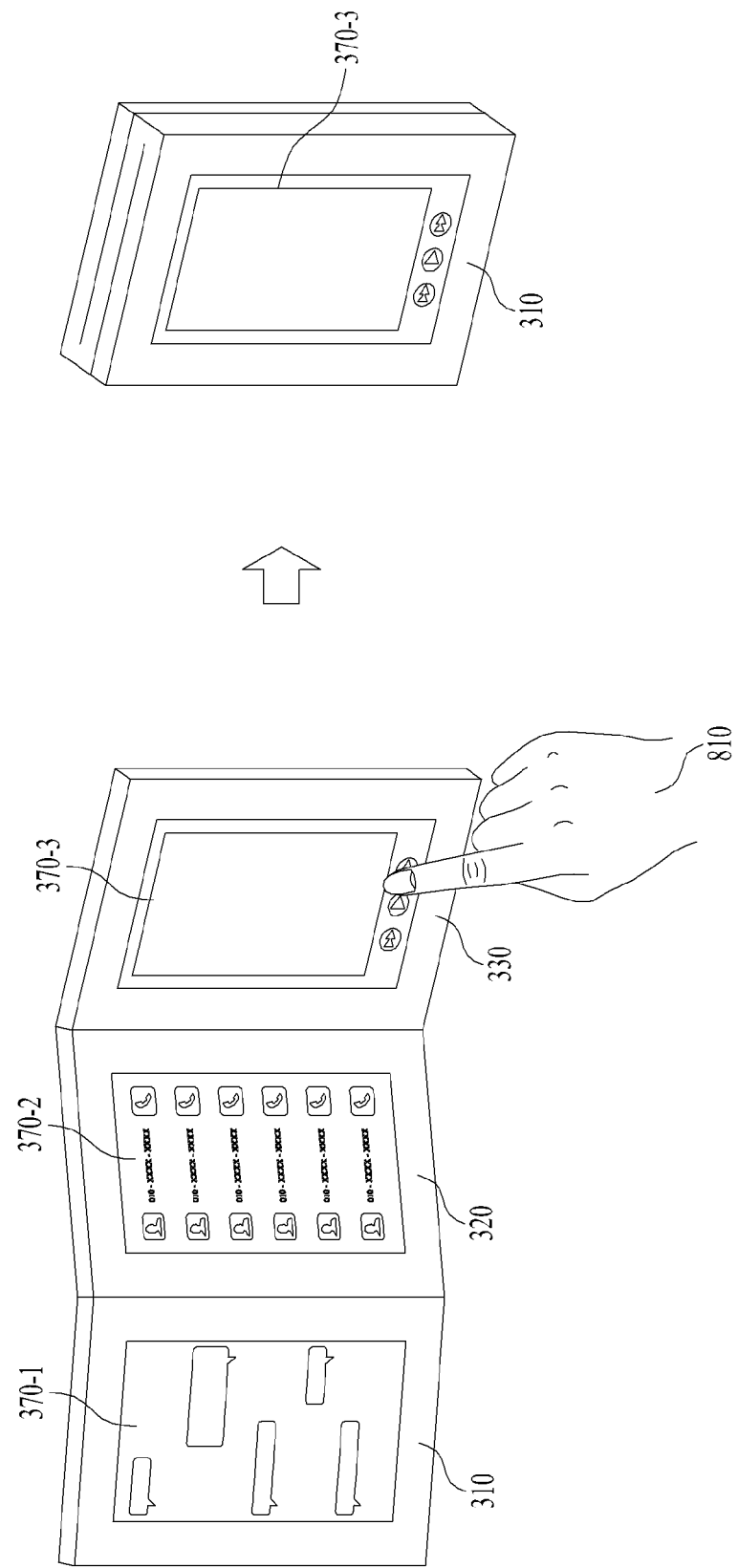

FIG. 8a and FIG. 8b illustrate a method of the portable device for displaying an application according to the exemplary embodiment of this specification. The portable device 100 may detect a second triggering signal changing the portable device 100 from an unfolded state to a folded state. At this point, for example, in case the portable device 100 includes three bodies, a back surface of the first body 310 may be overlapped with a back surface of the second body 320. And, a front surface of the second body 320 may be overlapped with a front surface of the third body 330. More specifically, in case the portable device 100 is being changed to the folded state, the front display area of the second body 320 and the front display area of the third body 330 may be deactivated. More specifically, the portable device 100 may display the visual information only in the front display area of the first body 310.

At this point, for example, when the portable device 100 is in the unfolded state, the portable device 100 may display a first application 370-1 on the front display area of the first body 310. Also, the portable device 100 may display a second application 370-2 on the front display area of the second body 320. And, the portable device 100 may display a third application 370-3 on the front display area of the third body 330. At this point, in case the portable device 100 detects a second triggering signal, changing the portable device 100 from an unfolded state to a folded state, the portable device 100 may display the first application 370-1 on the front display area of the first body 310. At this point, the portable device 100 may end the display of an application that is not being displayed on the front display area of the first body 310.

In yet another example, when the portable device 100 is in the unfolded state, the portable device 100 may detect a control input. At this point, in case the portable device 100 detects a control input, which selects the second application 370-2, and detects a second triggering signal, the portable device 100 may display the second application 370-2 on the front display area of the first body 310. Additionally, in case the portable device 100 detects a control input, which selects a third application 370-3, and detects a second triggering signal, the portable device 100 may display the third application 370-3 on the front display area of the first body 310. More specifically, the portable device 100 may display the application, which is selected in the folded. Accordingly, the user may select the application, when the portable device 100 is being changed to the folded state, so that the selected application can be displayed.

Figure 9B:
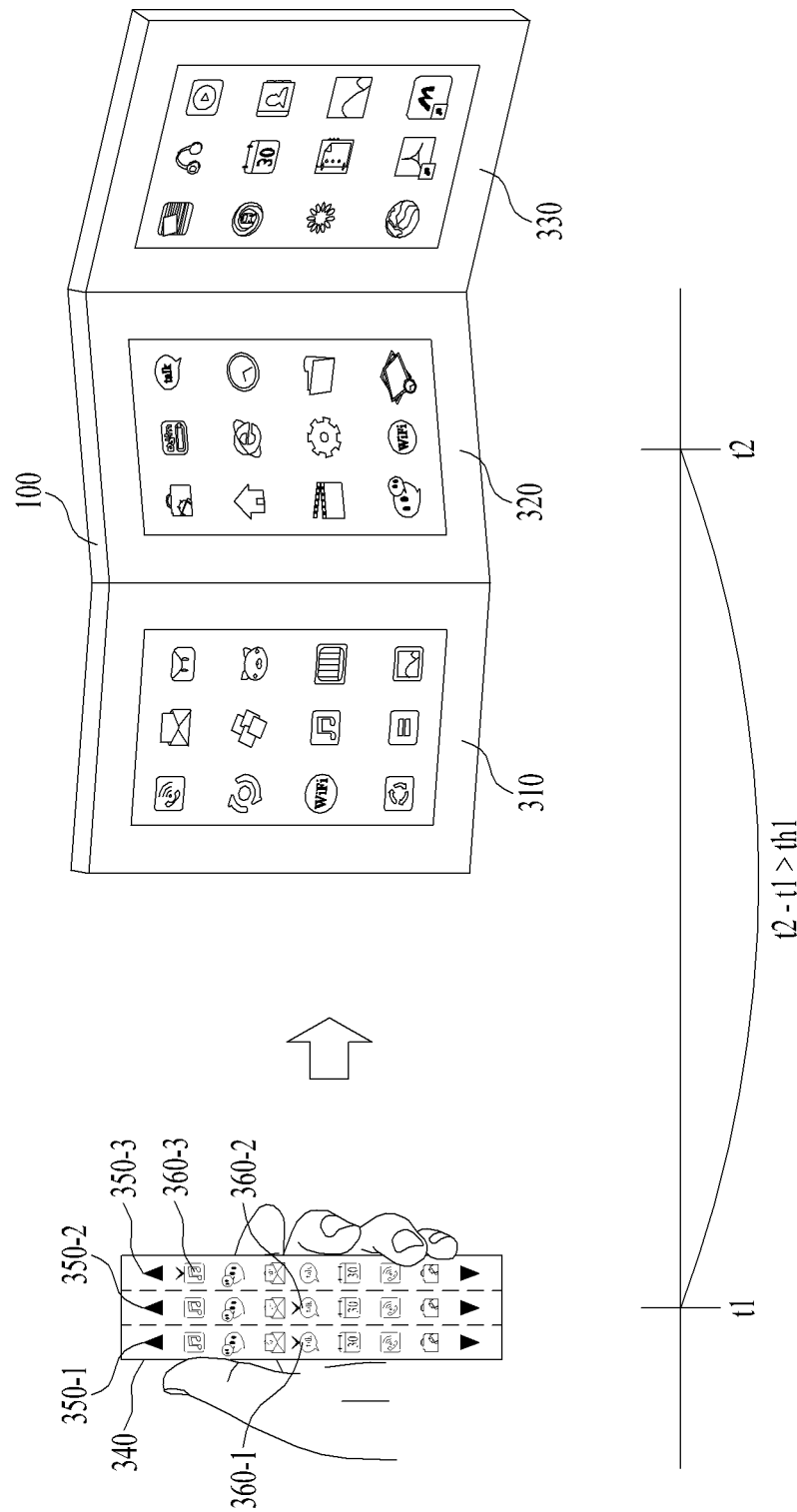
Figure 9C:
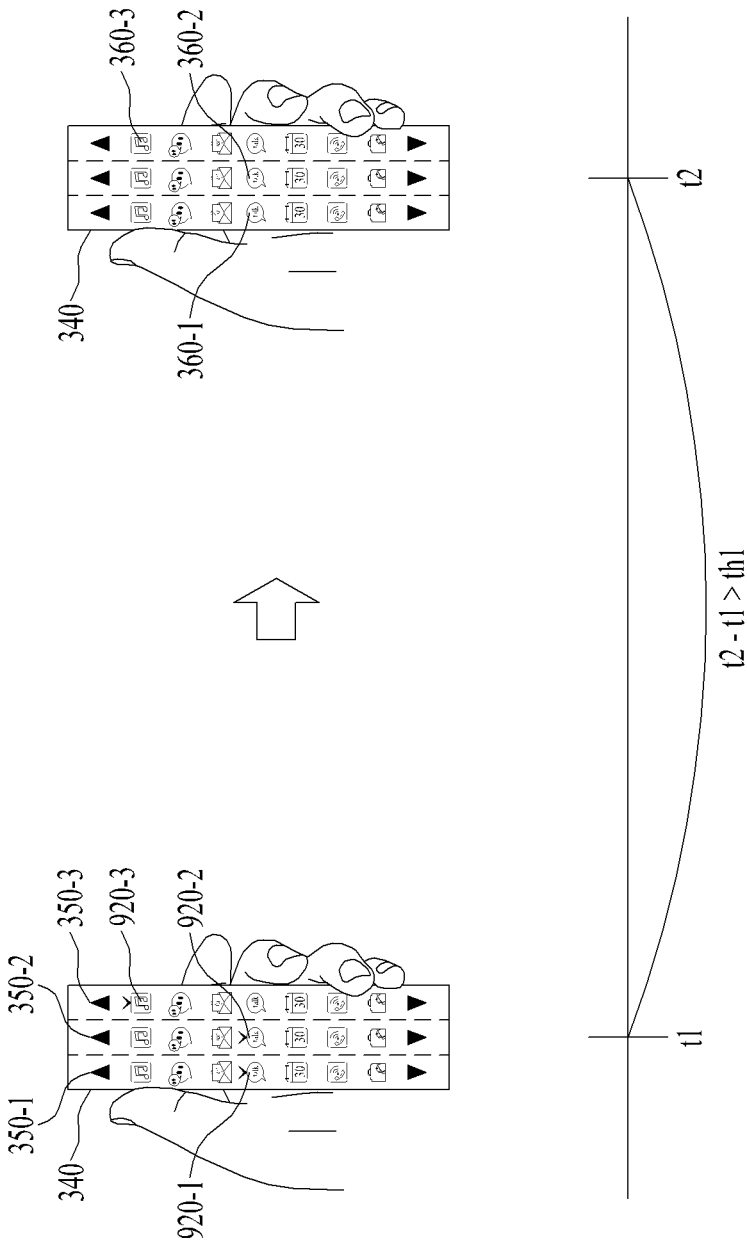

FIG. 9a to FIG. 9c illustrate a method of the portable device for displaying visual information based upon a threshold time according to the exemplary embodiment of this specification. As described above in FIG. 4a and FIG. 4b, the portable device 100 may display multiple applications based upon the first interface. At this point, the portable device 100 may control a display method based upon a threshold time.

More specifically, referring to FIG. 9a, the portable device 100 may detect a control input selecting multiple objects in the first interface. Thereafter, the portable device 100 may detect a first triggering signal changing the portable device 100 from the folded state to the unfolded state. At this point, for example, when the portable device 100 detects the control input and detects the first triggering signal within a first threshold time, the portable device 100 may display an application corresponding to the selected object.

At this point, for example, referring to FIG. 9a, the portable device 100 may detect a control input selecting a first object 360-1 of the first part 350-1. Additionally, the portable device 100 may detect a control input selecting a second object 360-2 of the second part 350-2. And, the portable device 100 may detect a control input selecting a third object 360-3 of the third part 350-3. At this point, for example, the portable device 100 may detect the first triggering signal within the first threshold time based upon a control input, which is detected in last place (i.e., the last control input that is detected). At this point, the first threshold time may correspond to a threshold time for displaying an application, and the first threshold time may have a predetermined difference range. At this point, the portable device 100 may display a first application 370-1 on the front display area of the first body 310. Also, the portable device 100 may display a second application 370-2 on the front display area of the second body 320. And, the portable device 100 may display a third application 370-3 on the front display area of the third body 330.

Additionally, referring to FIG. 9b, the portable device 100 may detect a control input, and, in a state when the first threshold time has elapsed, the portable device 100 may detect the first triggering signal. At this point, for example, the portable device 100 may respectively display multiple objects on the front display area of the first body 310, the front display area of the second body 320, and the front display area of the third body 330. At this point, for example, the portable device 100 may execute multiple applications in each body by selecting the multiple objects being displayed on the front display area of each body.

Additionally, referring to FIG. 9c, the portable device 100 may detect a control input and may not be capable of detecting the first triggering signal even after the first threshold time has elapsed. At this point, for example, the portable device 100 may release (or cancel) the selected object. More specifically, the portable device 100 may display indicators 920-1, 920-2, and 920-3 on the objects, which are selected based upon the control input. Accordingly, the user may verify the selected objects. At this point, in case the portable device 100 detects the control input, and, in case the portable device 100 does not detect the first triggering signal even after the first threshold time has elapsed, the portable device 100 may end the display of the indicators 920-1, 920-2, and 920-3. More specifically, the portable device 100 may display the first interface prior to the detection of the control input.

Figure 10B:
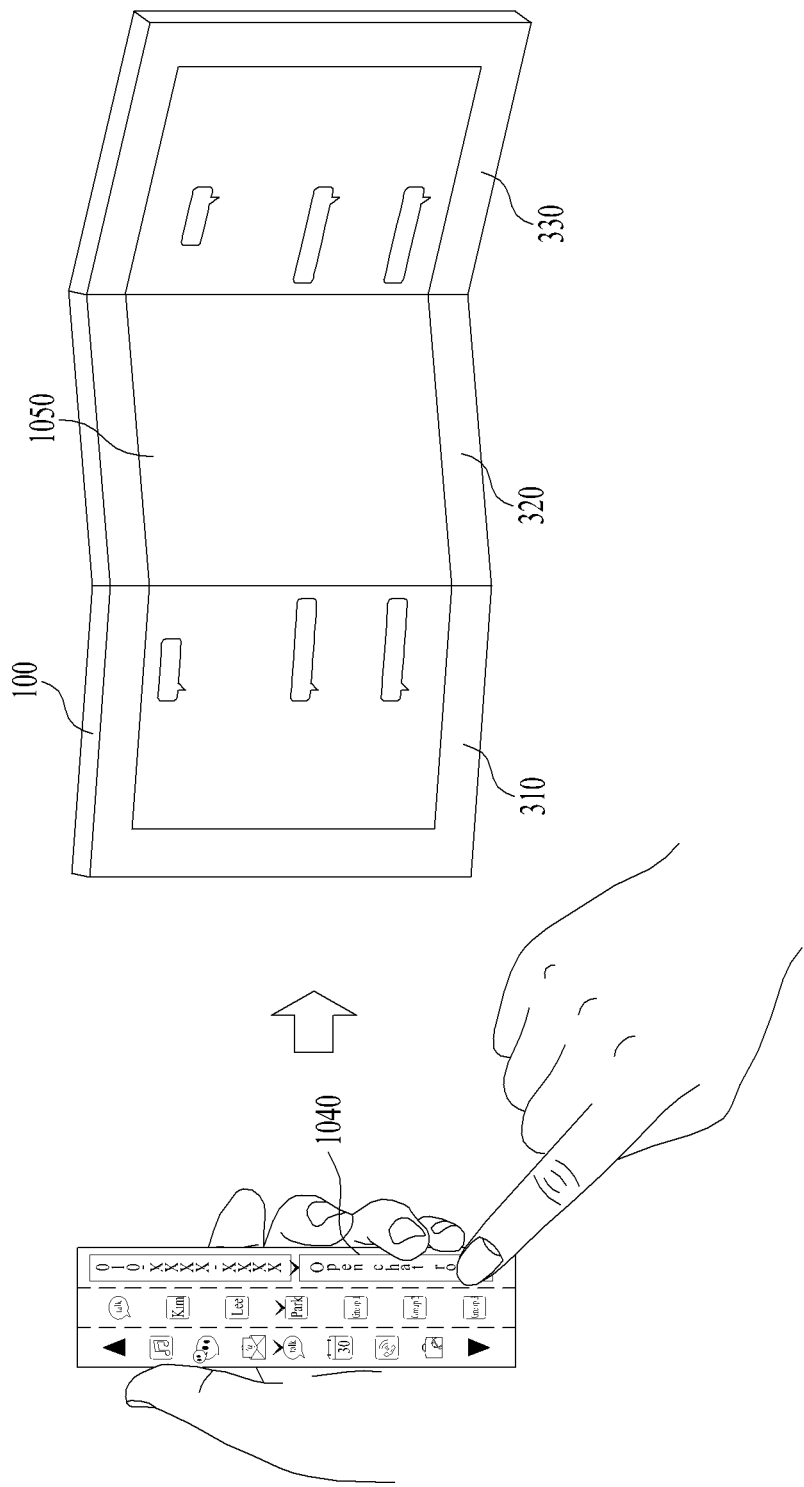

FIG. 10a and FIG. 10b illustrate a method of the portable device for displaying visual information on a side area of the portable device according to the exemplary embodiment of this specification. When the portable device 100 is in the folded state, the portable device 100 may display the first interface on the side display area 340. At this point, for example, the portable device 100 may display multiple objects on the first part 350-1. At this point, the portable device 100 may detect a control input, through which the user selects a first object 1020. At this point, the portable device 100 may display multiple objects related to the first object 1020 on the second part 350-2. At this point, for example, the portable device 100 may further display a first indicator 1060, which is adjacent to the first object 1020. At this point, the first indicator 1060 may correspond to an indicator indicating that the first object 1020 has been selected. Thereafter, the portable device 100 may detect a control input selecting a second object 1030, among the multiple objects that are displayed on the second part 350-2. At this point, the second object 1030 may correspond to an object that is related to the first object 1020. For example, the first object 1020 may correspond to an application, and the second object 1030 may correspond to each set of content included in the application. At this point, the portable device 100 may further display multiple objects related to the second object 1030 on the third part 350-3. At this point, the portable device 100 may detect a control input selecting a third object 1040, among the multiple objects that are included on the third part 350-3. At this point, the third object 1040 may correspond to an object that is related to the second object 1030. For example, the third object 1040 may correspond to a lower-level menu of the second object 1030. Thereafter, the portable device 100 may detect the first triggering signal changing the portable device 100 from a folded state to an unfolded state. At this point, the portable device 100 may display visual information 1050, which is related to the third object 1040.

For example, the first object 1020 may correspond to a messenger application. At this point, the second object 1020 may correspond to chat windows each included in the messenger application. Additionally, the third object 1040 may correspond to a menu for selecting whether or not to open a chat window. At this point, after the portable device 100 has detected a control input selecting the third object 1030, when the portable device 100 detects the first triggering signal, the portable device 100 may display a chat window 1050 as the visual information 1050. At this point, the chat window 1050 may be displayed on all of the front display areas of the first body 310, the second body 320, and the third body 330.

Figure 11:
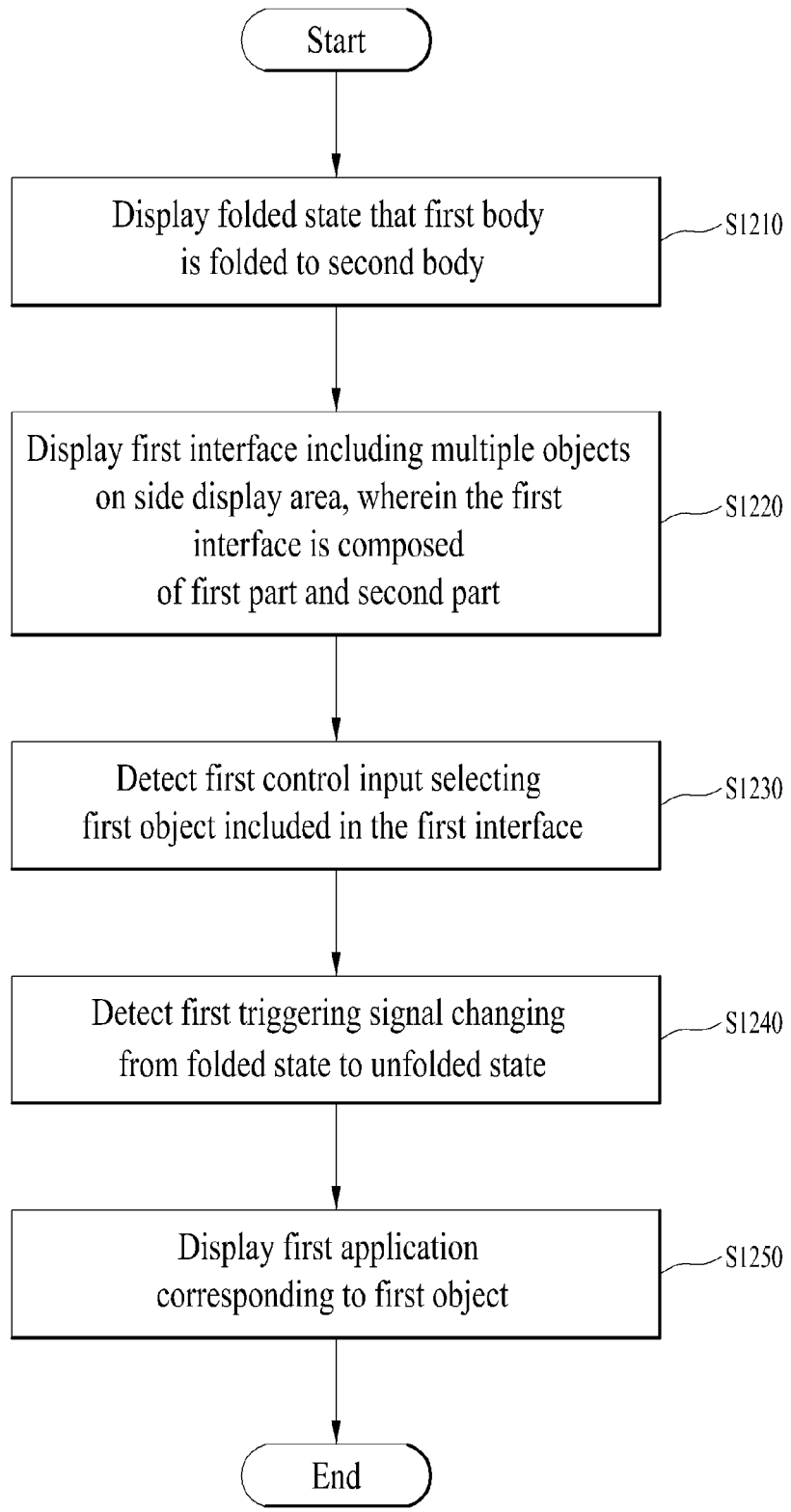
FIG. 11 illustrates a method for controlling the portable device according to the exemplary embodiment of this specification.

FIG. 11 illustrates a method for controlling the portable device according to the exemplary embodiment of this specification. The portable device 100 may detect a folded state, wherein a first body is folded to a second body (S1110). At this point, as described above with reference to FIG. 1, in case the portable device 100 includes two bodies, the folded state may be detected, when the first body and the second body are folded to overlap one another. Additionally, for example, in case the portable device 100 includes three bodies, the folded state may be detected, when the first body, the second body, and the third body are folded to overlap one another. More specifically, the portable device 100 may detect the folded state when all of the multiple bodies are folded.

Subsequently, the portable device 100 may be composed of a first part and a second part, and the portable device 100 may display a first interface including multiple objects on a side display area (S1120). At this point, as described above in FIG. 1, the side display area may be set of the side display areas of each body. More specifically, in case the portable device 100 is in a folded state, the multiple bodies may be adjacent to one another. At this point, the side display area may be set by combining the side display areas of neighboring bodies. Additionally, as described above, the first part may correspond to the first body, and the second part may correspond to the second body.

Thereafter, the portable device 100 may detect a first control input selecting a first object, which is included in the first interface (S1130). At this point, as described above in FIG. 1, the portable device 100 may detect a first control input by using a control input sensing unit.

Subsequently, the portable device 100 may detect a first triggering signal changing the portable device 100 from a folded state to an unfolded state (S1140). At this point, as described above in FIG. 1, the portable device 100 may detect a state of the portable device 100 having the multiple bodies unfolded to a flat state as the unfolded state. Additionally, for example, the portable device 100 may detect whether or not it is folded based upon a distance or angle between each of the bodies.

Finally, the portable device 100 may display a first application corresponding to the first object (S1150). At this point, as described above in FIG. 1, in case the portable device 100 includes two parts, the portable device 100 may change a position where the first application is being displayed based upon the display position of the first object. More specifically, in case the first object is located in the first part, the portable device 100 may display the first application on the front display area of the first body. Additionally, in case the first object is located in the second part, the portable device 100 may display the first application on the front display area of the second body. In yet another example, in case the portable device 100 includes three bodies, the first interface may include a first part, a second part, and a third part. At this point, in case the first object is located in the third part, the portable device 100 may display the first application on the front display area of the third body. Herein, each part of the first interface may respectively correspond to each of the multiple bodies. At this point, the portable device 100 may select a body wherein the first application is being displayed based upon the display position of the first object.

As described above, this specification provides a portable device and a method for controlling the same, which have the following advantages. This specification may provide a portable device having a structure including multiple bodies. And, the portable device may provide a method for displaying visual information on a side area of the portable device. Moreover, the portable device may display an interface on the side area of the portable device, when the portable device is in a folded state, wherein the multiple bodies of the portable device are folded.

Additionally, the portable device may control visual information being displayed on a front area of the portable device by using the interface being displayed on the side area of the portable device. And, the portable device may execute an application based upon a triggering signal changing the portable device from the folded state to an unfolded state. Finally, the portable device may set multiple parts each corresponding to the respective body on the side area of the portable device.

Furthermore, although the drawings have been distinguished and divided in order to facilitate the description of this specification, this specification may provide a design for configuring a new embodiment by combining some of the previously described embodiments of this specification. Moreover, whenever required by anyone skilled in the art, the scope of this specification includes designing a recording medium readable by a computer, the computer having a program for executing the above-described embodiments of this specification recorded therein.

The portable device 100 and the method for controlling the same according to this specification may not be limited only to the above-described configuration and methods according to the exemplary embodiments of this specification. Accordingly, variations of the exemplary embodiments of this specification may be set by selectively combining each exemplary embodiment of this specification fully or in part.

Meanwhile, the portable device 100 and the method for controlling the same according to this specification may be realized as a code that can be read by a processor, which is provided in a network device, in a recording medium that can be read by a processor. The recording medium that can be read by the processor includes all types of recording devices storing data that can be read by the processor. Examples of the recording media that can be read by a processor may include ROMs, RAMs, magnetic tapes, floppy disks, optical data storing devices, and so on. Also, an exemplary recording medium being realized in the form of a carrier wave, such as a transmission via Internet, may also be included. Also, the recording medium that can be read by a processor may be scattered within a computer system, which is connected through a network. And, a code that can be read by the processor may be stored and executed by using a dispersion (or scattering) method.

It will be apparent to those skilled in the art that various modifications and variations can be made in this specification without departing from the spirit or scope of this specification. Thus, it is intended that this specification covers the modifications and variations of this invention provided they come within the scope of the appended claims and their equivalents. It is also apparent that such variations of this specification are not to be understood individually or separately from the technical scope or spirit of this specification.

Also, a device invention and a method invention are both described in this specification. Therefore, whenever required, the description of both inventions may be supplementarily applied.

What is claimed is:

1. As a portable device comprising a first body and a second body, the portable device comprises:
    a display unit configured to display visual information on at least one of a front display area of the first body, a side display area of the first body, a front display area of the second body, and a side display area of the second body;
    a control input sensing unit configured to detect a control input;
    a folding sensor unit configured to detect that the first body is folded to the second body; and
    a processor configured to control the display unit, the control input sensing unit, and the folding sensor unit,
    wherein the processor is further configured to:
    detect a folded state that the first body is folded to the second body,
    display a first interface including multiple objects on a side display area of the portable device,
    wherein the first interface is composed of a first part and a second part,
    detect a first control input selecting a first object included in the first interface, and
    display a first application corresponding to the first object when a first triggering signal changing from the folded state to an unfolded state is detected,
    wherein the first application is displayed on the front display area of the first body when the first object is located in the first part, and the first application is displayed on the front display area of the second body when the first object is located in the second part.

2. The portable device of claim 1, wherein the unfolded state corresponds to a state that the first body and the second body are unfolded to a flat state.

3. The portable device of claim 1, wherein the processor is further configured to:
    set the side display area of the portable device as the side display area of the first body and the side display area of the second body when the portable device is the folded state.

4. The portable device of claim 3, wherein the first part is set in the side display area of the first body and the second part is set in the side display area of the second body.

5. The portable device of claim 1, further comprising:
    a rotation sensor unit configured to detect that the portable device is rotated based on a front direction,
    wherein the processor is further configured to:
    display the first interface when a rotation of the portable device at a first threshold angle or more based on the front direction is detected in the folded state.

6. The portable device of claim 1, wherein the first object corresponds to an object located in the first part and the second object corresponds to an object located in the second part.

7. The portable device of claim 6, wherein the processor is further configured to:
    display the first application corresponding to the first object on the front display area of the first body and display a second application corresponding to the second object on the front display area of the second body when the first triggering signal is detected after a second control input selecting the second object is further detected.

8. The portable device of claim 7, wherein the processor is further configured to:
  display the first application on all of the front display area of the first body and the front display area of the second body when the first application is equal to the second application.

9. The portable device of claim 8, wherein the processor is further configured to:
  display a first content on the front display area of the first body and a second content on the second display area of the second body when the first object corresponds to the first content of the first application and the second object corresponds to the second content of the first application.

10. The portable device of claim 7, wherein the processor is further configured to:
  display the first application on the front display area of the first body and terminate the display of the second application when a second triggering signal changing from the unfolded state to the folded state is detected.

11. The portable device of claim 10, wherein the processor is further configured to:
  display the selected application based on a control input on the front display area of the first body and terminate the display of non-selected application when the second triggering signal is detected after the control input selecting any one of the first application and second application is detected when the portable device is in the unfolded state.

12. The portable device of claim 11, wherein the folded state corresponds to a state that a back surface of the first body and a back surface of the second body overlap one another, and
  wherein the processor is further configured to:
  display the visual information only on the front display area of the first body when the portable device is in the folded state.

13. The portable device of claim 7, wherein the processor is further configured to:
  if the first triggering signal is detected while a second control input selecting the second object is not detect, display the first application corresponding to the first object on the front display area of the first body and a second interface on the front display area of the second body.

14. The portable device of claim 13, wherein the second interface corresponds to any one of a Home screen interface and a menu interface.

15. The portable device of claim 6, wherein the processor is further configured to:
  display a first indicator when the first control input is detected,
  wherein the first indicator corresponds to an indicator that the first object is selected in the first part.

16. The portable device of claim 6, wherein the processor is further configured to:
  display the first application when the first triggering signal is detected within a first threshold time after the first control input is detected.

17. The portable device of claim 1, wherein the first object corresponds to an object located in the first part, and
  Wherein the processor is further configured to:
  display multiple objects related to the first object on the second part when the first control input is detected.

18. The portable device of claim 1, further comprising:
  a third body, and
  wherein the display unit further displays visual information on at least any one of a front display area of the third body and a side display area of the third body, and
  wherein the folding sensor unit further detects whether or not the third body is being folded to the second body, and
  wherein the processor is further configured to:
  detect the folded state when all of the first body, the second body, and the third body are folded, and
  display the first interface on the side display area, wherein the first interface further includes a third part,
  display the first application on a front display area of the third body when the first object is located in the third part.

19. The portable device of claim 1, wherein the portable device is a flexible device,
  wherein the processor is further configured to set the first body and the second body based on a folding line along which the flexible device is folded.

20. As a method for controlling a portable device comprising a first body and a second body, the method comprises:
  detecting a folded state that the first body is folded to the second body;
  displaying a first interface including multiple objects on a side display area, wherein the first interface is composed of a first part and a second part;
  detecting a first control selecting a first object included in the first interface; and
  displaying a first application corresponding to the first object when a first triggering signal changing from the folded state to an unfolded state is detected,
  wherein the first application is displayed on the front display area of the first body when the first object is located in the first part, and the first application is displayed on the front display area of the second body when the first object is located in the second part.

* * * * *